US012802901B2

(12) United States Patent
Abbott et al.

(10) Patent No.: US 12,802,901 B2
(45) Date of Patent: Nov. 17, 2026

(54) POWER TOOL PACK ADAPTER HAVING AUDIO AND VIDEO COMPONENTS

(71) Applicant: Milwaukee Electric Tool Corporation, Brookfield, WI (US)

(72) Inventors: Jonathan E. Abbott, Milwaukee, WI (US); Christian U. Martinez, Genoa City, WI (US); Daniel E. Endean, Hartland, WI (US); Colin J. Roberts, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 185 days.

(21) Appl. No.: 18/691,770

(22) PCT Filed: Dec. 2, 2022

(86) PCT No.: PCT/US2022/051621

§ 371 (c)(1),
(2) Date: Mar. 13, 2024

(87) PCT Pub. No.: WO2023/102164

PCT Pub. Date: Jun. 8, 2023

(65) Prior Publication Data

US 2024/0347286 A1 Oct. 17, 2024

Related U.S. Application Data

(60) Provisional application No. 63/285,605, filed on Dec. 3, 2021.

(51) Int. Cl.
*H01H 9/06* (2006.01)
*G10L 15/22* (2006.01)
(Continued)

(52) U.S. Cl.
CPC ............... *H01H 9/06* (2013.01); *G10L 15/22* (2013.01); *H02J 7/47* (2026.01); *H02J 7/855* (2026.01);
(Continued)

(58) Field of Classification Search
CPC .... B25F 5/00; B25F 5/02; B25F 5/001; B25F 5/008; B25F 5/005; B25F 3/00;
(Continued)

(56) References Cited

U.S. PATENT DOCUMENTS 6,260,427 B1 7/2001 Jones et al.
9,275,637 B1 * 3/2016 Salvador ................ G10L 15/06
(Continued)

FOREIGN PATENT DOCUMENTS

CN 116893023 A 10/2023
CN 117705329 A 3/2024
(Continued)

*Primary Examiner* — Jacob A Smith
(74) *Attorney, Agent, or Firm* — Quarles & Brady LLP

(57) ABSTRACT

Adapters for a power tool are backwards compatible with a variety of different power tools, battery packs, and other power tool devices. The power tool pack adapter fits between a power tool and a battery pack (or other such power tool devices) and provides extra functionality (e.g., voice control, cameras, machine learning, etc.) to a power tool or other power tool device. The added functionality can be implemented by a dedicated electronic controller and/or processor in the power tool pack adapter.

20 Claims, 11 Drawing Sheets

(51) Int. Cl.

| | |
|---|---|
| ***H02J 7/00*** | (2006.01) |
| ***H02J 7/47*** | (2026.01) |
| *H02J 105/00* | (2026.01) |
| *H02J 105/44* | (2026.01) |
| *H02J 105/54* | (2026.01) |

(52) U.S. Cl.
CPC .. *G10L 2015/223* (2013.01); *H01H 2009/065* (2013.01); *H02J 2105/44* (2026.01); *H02J 2105/54* (2026.01); *H02J 2105/61* (2026.01)

(58) Field of Classification Search
CPC ......... B25F 5/026; B25B 21/02; B25B 21/00; B25B 21/026; B25B 27/10; B25B 23/0035; B25B 23/1475; B25B 21/004; B25B 21/1475; B25B 23/147; B25B 23/141
USPC .... 173/1, 217, 48, 93, 109, 178, 128, 2, 90, 173/171, 29, 46, 170, 216, 104, 176
See application file for complete search history.

(56) References Cited

U.S. PATENT DOCUMENTS

| | | | | |
|---|---|---|---|---|
| 10,657,176 | B1 * | 5/2020 | Pham | G11B 27/34 |
| 11,366,457 | B1 | 6/2022 | George et al. | |
| 2003/0037423 | A1 | 2/2003 | Siegel | |
| 2005/0167130 | A1 | 8/2005 | Setter et al. | |
| 2006/0289183 | A1 | 12/2006 | Schreiber | |
| 2008/0021590 | A1 | 1/2008 | Vanko et al. | |
| 2010/0114358 | A1 | 5/2010 | Krapf et al. | |
| 2013/0187587 | A1 | 7/2013 | Knight et al. | |
| 2013/0327552 | A1 | 12/2013 | Lovelass et al. | |
| 2014/0338939 | A1 | 11/2014 | Shi | |
| 2014/0367134 | A1 | 12/2014 | Phillips et al. | |
| 2015/0101835 | A1 | 4/2015 | Nitsche et al. | |
| 2015/0178620 | A1 | 6/2015 | Ascari et al. | |
| 2016/0000025 | A1 | 1/2016 | Hamann et al. | |
| 2016/0342142 | A1 | 11/2016 | Boeck et al. | |
| 2016/0361069 | A1 | 12/2016 | Ardel et al. | |
| 2016/0375570 | A1 | 12/2016 | Boeck et al. | |
| 2017/0090430 | A1 | 3/2017 | Nakazawa | |
| 2017/0222382 | A1 | 8/2017 | Peloquin et al. | |
| 2018/0054032 | A1 | 2/2018 | Peloquin et al. | |
| 2018/0328797 | A1 | 11/2018 | Gwon et al. | |
| 2019/0187659 | A1 | 6/2019 | Li et al. | |
| 2019/0227528 | A1 | 7/2019 | Abbott et al. | |
| 2020/0156210 | A1 | 5/2020 | Sullivan et al. | |
| 2020/0160152 | A1 | 5/2020 | Buttner et al. | |
| 2020/0267903 | A1 | 8/2020 | Gao et al. | |
| 2020/0276680 | A1 | 9/2020 | Green et al. | |
| 2020/0326718 | A1 | 10/2020 | Kandemir et al. | |
| 2020/0338677 | A1 | 10/2020 | Ozeki | |
| 2020/0384618 | A1 | 12/2020 | Tanji et al. | |
| 2021/0016894 | A1 | 1/2021 | Childress | |
| 2021/0053212 | A1 | 2/2021 | Haetty | |
| 2021/0101263 | A1 | 4/2021 | Hwang et al. | |
| 2021/0101304 | A1 | 4/2021 | Green et al. | |
| 2021/0104006 | A1 | 4/2021 | Green | |
| 2021/0116894 | A1 | 4/2021 | Wichern et al. | |
| 2021/0157297 | A1 | 5/2021 | Kaiser et al. | |
| 2021/0166154 | A1 | 6/2021 | Ogino | |
| 2021/0192386 | A1 | 6/2021 | Cabrita et al. | |
| 2021/0205976 | A1 | 7/2021 | Matei | |
| 2021/0240145 | A1 | 8/2021 | Abbott | |
| 2021/0302921 | A1 | 9/2021 | Kolter et al. | |
| 2021/0312262 | A1 | 10/2021 | Postel | |
| 2021/0326663 | A1 | 10/2021 | Winston et al. | |
| 2021/0374549 | A1 | 12/2021 | Willmott et al. | |
| 2021/0383234 | A1 | 12/2021 | Bai et al. | |
| 2021/0393337 | A1 | 12/2021 | Zucker | |
| 2021/0394344 | A1 | 12/2021 | Mueckl et al. | |
| 2022/0019900 | A1 | 1/2022 | Wong et al. | |
| 2022/0050023 | A1 | 2/2022 | Lavazais et al. | |
| 2022/0067913 | A1 | 3/2022 | Lutz et al. | |
| 2022/0092466 | A1 | 3/2022 | Carbrita et al. | |
| 2022/0100850 | A1 | 3/2022 | Sun et al. | |
| 2022/0101116 | A1 | 3/2022 | Sheikholeslami et al. | |
| 2022/0101143 | A1 | 3/2022 | Rice et al. | |
| 2022/0108132 | A1 | 4/2022 | Zhang et al. | |
| 2022/0111496 | A1 | 4/2022 | Beacham, Jr. et al. | |
| 2022/0118595 | A1 | 4/2022 | Abbott et al. | |
| 2022/0121177 | A1 | 4/2022 | Kerwin | |
| 2022/0138510 | A1 | 5/2022 | Dai et al. | |
| 2022/0138511 | A1 | 5/2022 | Xu et al. | |
| 2022/0172061 | A1 | 6/2022 | Willmott et al. | |
| 2022/0197227 | A1 | 6/2022 | Woehlke et al. | |
| 2022/0261618 | A1 | 8/2022 | Garcia et al. | |
| 2022/0266429 | A1 | 8/2022 | Erbele et al. | |
| 2022/0292349 | A1 | 9/2022 | Stoll et al. | |
| 2022/0299946 | A1 | 9/2022 | Abbott et al. | |
| 2022/0313374 | A1 | 10/2022 | Jacobsen et al. | |
| 2022/0318616 | A1 | 10/2022 | Kamble et al. | |
| 2022/0347811 | A1 | 11/2022 | Abbott et al. | |
| 2022/0405648 | A1 | 12/2022 | Lin et al. | |
| 2022/0407274 | A1 | 12/2022 | Radtke et al. | |
| 2022/0410360 | A1 | 12/2022 | Erbele et al. | |
| 2023/0039379 | A1 | 2/2023 | Schmidt | |
| 2023/0057100 | A1 | 2/2023 | Schirmer et al. | |
| 2023/0100132 | A1 | 3/2023 | Rice et al. | |
| 2023/0100765 | A1 | 3/2023 | Roderick et al. | |
| 2023/0101812 | A1 | 3/2023 | Feng et al. | |
| 2023/0102866 | A1 | 3/2023 | Bai et al. | |
| 2023/0107463 | A1 | 4/2023 | Baharloui et al. | |
| 2023/0107917 | A1 | 4/2023 | Pabbaraju et al. | |
| 2023/0115313 | A1 | 4/2023 | Weber et al. | |
| 2023/0115521 | A1 | 4/2023 | Kupcsik et al. | |
| 2023/0141816 | A1 | 5/2023 | Butzerin et al. | |
| 2023/0219204 | A1 | 7/2023 | Dieter et al. | |
| 2023/0251614 | A1 | 8/2023 | Lutz et al. | |
| 2023/0298315 | A1 | 9/2023 | Sheikholeslami et al. | |
| 2023/0316067 | A1 | 10/2023 | Rudolph et al. | |
| 2023/0321796 | A1 | 10/2023 | Speckman et al. | |
| 2023/0339142 | A1 | 10/2023 | Mayer et al. | |
| 2023/0356341 | A1 | 11/2023 | Volpert | |
| 2023/0367269 | A1 | 11/2023 | Glennon et al. | |
| 2023/0406344 | A1 | 12/2023 | Jiang et al. | |
| 2024/0020638 | A1 | 1/2024 | Adcock et al. | |
| 2024/0037282 | A1 | 2/2024 | Rice et al. | |
| 2024/0037446 | A1 | 2/2024 | Vogt et al. | |
| 2024/0051107 | A1 | 2/2024 | Petersson et al. | |
| 2024/0070451 | A1 | 2/2024 | Zhang et al. | |
| 2024/0096067 | A1 | 3/2024 | Mahmud et al. | |
| 2024/0104339 | A1 | 3/2024 | Norouzzadeh et al. | |
| 2024/0112455 | A1 | 4/2024 | He et al. | |
| 2024/0134597 | A1 * | 4/2024 | Dontcheva | G06F 3/0484 |
| 2024/0198475 | A1 | 6/2024 | Bralla et al. | |
| 2024/0198506 | A1 | 6/2024 | Leray et al. | |
| 2024/0217082 | A1 | 7/2024 | Abbott et al. | |
| 2024/0347286 | A1 | 10/2024 | Abbott et al. | |
| 2024/0367296 | A1 | 11/2024 | Nakamura et al. | |

FOREIGN PATENT DOCUMENTS

| | | | | |
|---|---|---|---|---|
| DE | 102017203149 | A1 | 10/2018 | |
| DE | 102018218685 | A1 | 4/2020 | |
| DE | 102019131627 | A1 | 5/2021 | |
| DE | 102020205165 | A1 | 10/2021 | |
| DE | 102020213080 | A1 | 4/2022 | |
| DE | 102021126487 | A1 | 4/2023 | |
| DE | 102022209277 | A1 | 3/2024 | |
| DE | 102022003797 | A1 | 4/2024 | |
| EP | 1398119 | A1 | 3/2004 | |
| EP | 3200313 | A1 * | 8/2017 | H02J 7/731 |
| EP | 3623108 | A1 | 3/2020 | |
| EP | 3716160 | A1 | 9/2020 | |
| EP | 3770820 | A1 | 1/2021 | |
| EP | 3772398 | A1 | 2/2021 | |
| EP | 3913547 | A1 | 11/2021 | |
| EP | 3950230 | A1 | 2/2022 | |
| EP | 4357983 | A1 | 4/2024 | |
| JP | 2012-200807 | A | 10/2012 | |
| JP | 2022-153183 | A | 10/2022 | |
| WO | 2009/138268 | A1 | 11/2009 | |

(56) References Cited

FOREIGN PATENT DOCUMENTS

| | | | |
|---|---|---|---|
| WO | 2017/162130 | A1 | 9/2017 |
| WO | 2020/073955 | A1 | 4/2020 |
| WO | 2021/042233 | A1 | 3/2021 |
| WO | 2021/060090 | A1 | 4/2021 |
| WO | 2021/241111 | A1 | 12/2021 |
| WO | 2023/000659 | A1 | 1/2023 |
| WO | 2023/076385 | A2 | 5/2023 |
| WO | 2023/076953 | A1 | 5/2023 |
| WO | 2023/076954 | A1 | 5/2023 |
| WO | 2023/076955 | A1 | 5/2023 |
| WO | 2023/110231 | A1 | 6/2023 |
| WO | 2023/180247 | A1 | 9/2023 |
| WO | 2023/186501 | A1 | 10/2023 |
| WO | 2023/217792 | A1 | 11/2023 |
| WO | 2023/222382 | A1 | 11/2023 |
| WO | 2024/044660 | A1 | 2/2024 |

* cited by examiner

POWER TOOL PACK ADAPTER HAVING AUDIO AND VIDEO COMPONENTS

CROSS-REFERENCE TO RELATED APPLICATIONS

This application is a 371 application of PCT/US2022/051621, filed on Dec. 2, 2022, which is based on and claims the benefit of U.S. Provisional Patent Application Ser. No. 63/285,605, filed on Dec. 3, 2021, and entitled "POWER TOOL PACK ADAPTER HAVING AUDIO AND VIDEO COMPONENTS," each of which are herein incorporated by reference in their entirety.

BACKGROUND

Power tools are often powered by portable battery packs. Typically, a portable battery pack is coupled to a pack interface on a power tool.

SUMMARY OF THE DISCLOSURE

The present disclosure provides an adapter for a power tool. The adapter includes a housing, a first interface supported by the housing and configured to couple to a first power tool device, and a second interface supported by the housing and configured to couple to a second power tool device. The second interface is in electrical communication with the first interface. At least one microphone is also coupled to the housing. An electronic controller is supported by the housing and coupled to the first interface, the second interface, and the at least one microphone. The electronic controller is configured to: receive audio data recorded by the at least one microphone; process the audio data to determine a voice command in the audio data; convert the voice command to a control action; and control operation of at least one of the electronic controller, the first power tool device, or the second power tool device based on the control action.

In another aspect, the present disclosure provides for an adapter for a power tool that includes a housing, a first interface supported by the housing and configured to couple to a first power tool device, and a second interface supported by the housing and configured to couple to a second power tool device. The second interface is in electrical communication with the first interface. At least one camera is also coupled to the housing. An electronic controller is supported by the housing and coupled to the first interface, the second interface, and the at least one camera, the electronic controller configured to: receive image data recorded by the at least one camera; and store the image data on a memory of the electronic controller.

The electronic controller may also be configured to transmit the image data to at least one of an external device or a server. In some instances, the adapter may also include a wireless communication device coupled to the electronic controller and configured to receive the image data from the electronic controller and to transmit the image data to the at least one of the external device of the server.

In still another aspect, the present disclosure provides for an adapter for a power tool that includes a housing, a first interface supported by the housing and configured to couple to a first power tool device, and a second interface supported by the housing and configured to couple to a second power tool device. The second interface is in electrical communication with the first interface, and the first interface is laterally offset relative to the second interface.

As described, the first and second power tool devices may include combinations of power tools, battery packs, power tool battery chargers, power supplies, and the like. As an example, the first power tool device may be a power tool and the second power tool device may be a battery pack. As another example, the first power tool device may be a battery pack and the second power tool device may be a power tool battery charger. As still another example, the first power tool device may be a battery pack and the second power tool device may be a power supply.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1A:
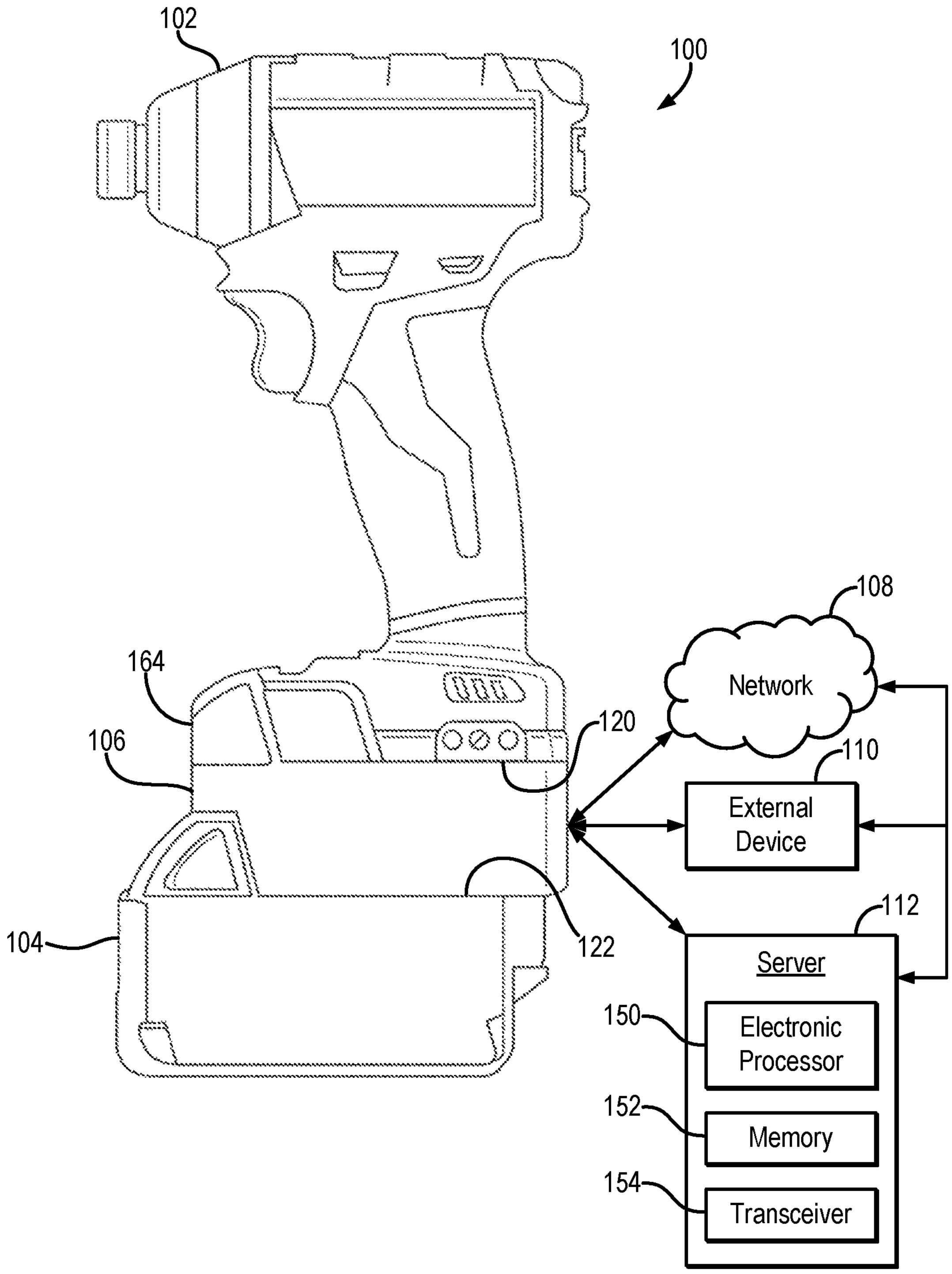
FIG. 1A illustrates an example power tool system including a power tool pack adapter coupled between a power tool and a battery pack.

The present disclosure relates to enabling sound and vision-related functionality with power tools and power tool devices. Many power tool devices (e.g., power tools, power tool battery chargers, battery packs, power tool adapters, power supplies (e.g., inverters), lasers (e.g., rotary lasers, point lasers)) are not directly or fully internet-of-things ("IoT") compatible. For example, the power tool devices may lack a Bluetooth®, Wi-Fi®, cellular, NFC, or other wireless transmission means. Some power tool devices may have a wired interface, such as a universal serial bus (USB) port or dual-function battery interface terminals, that enable data communication, but these require special coupling means (e.g., adapters or USB plugs) to be able to allow such data communication.

In some embodiments provided herein, a power tool pack adapter can be positioned between a power tool and one or more battery packs. With the addition of machine learning and/or artificial intelligence, such pack adapters can make use of audio and visual recognition. Additionally or alternatively, the power tool pack adapter can be configured to add an improved user interface ("UI") experience for users by enabling robust customization of the connected power tool device(s) (e.g., power tool, battery pack, power tool battery charger, and the like). The power tool pack adapters described in the present disclosure provide an advantageous solution for users that want a lower cost option to integrate these added functionalities into a wide array of power tools or other power tool devices that otherwise lack machine learning control, artificial intelligence control, an improved UI, or other functional features enabled by the power tool pack adapters and described in the present disclosure.

The power tool pack adapters described in the present disclosure are backwards compatible with a variety of different power tools, battery packs, and other power tool devices. The power tool pack adapter fits between a power tool and a battery pack (or other such power tool devices) and provides extra functionality (e.g., voice control, cameras, machine learning, etc.) to a power tool or other power tool device that was not originally equipped with it. The added functionality can be implemented by a dedicated electronic controller and/or processor in the power tool pack adapter. A user can have a single power tool pack adapter for many tools, thereby providing a cost effective solution for adding functionality without the user having to purchase new power tool devices.

Data that can be transmitted using the power tool pack adapter include power tool device data collected from a connected power tool device (e.g., a connected power tool, a connected battery pack, or other connected power tool device). Power tool device data may include usage data, maintenance data, feedback data, power source data, sensor data, environmental data, operator data, location data, rental data, among other data, which may be associated with a power tool device, such as a power tool battery charger, a battery pack, a power tool, and/or a power tool pack adapter.

Usage data may include usage data for a power tool battery charger, a power tool battery pack, a power tool, or other devices connected to a power tool device network, such as wireless communication devices, control hubs, access points, and/or peripheral devices (e.g., smartphones, tablet computers, laptop computers, portable music players, and the like).

Usage data for a power tool battery charger may include operation time of the power tool battery charger (e.g., how long the power tool battery charger is used in each session, the amount of time between sessions of power tool battery charger usage, and the like), times of day when battery packs are being put on and/or taken off of the power tool battery charger, unique identifiers of battery packs being put on and/or taken off of the power tool battery charger, specific hours when work is being performed on a jobsite (or being performed more or less frequently on the jobsite), days of the week when work is being performed on a jobsite (or being performed more or less frequently on the jobsite), charging patterns, and the like. In some embodiments, usage data may include data indicating the order in which batteries are put on a power tool battery charger with multiple charging ports, or on power tool battery chargers in a network of connected (e.g., wired or wirelessly) power tool battery chargers.

Usage data for a battery pack may include operation time of the battery pack (e.g., how long the battery pack is used in each session, the amount of time between sessions of battery pack usage, and the like), the types of power tool(s) on which the battery pack is being used, the frequency with which the battery pack is being used, the frequency with which the battery pack is being used with a particular power tool or power tool type, the frequency with which the battery pack is charged on a particular power tool battery charger or power tool battery charger type, the current charge capacity of the battery pack (e.g., the state of charge of the battery pack), the number of charge cycles the battery pack has gone through, the estimated remaining useful life of the battery pack, and the like. In some embodiments, usage data may include data indicating the usage of a particular battery.

Usage data for a power tool may include the operation time of the power tool (e.g., how long the power tool is used in each session, the amount of time between sessions of power tool usage, and the like); whether a particular battery pack is used with the power tool and/or the frequency with which the particular battery pack is used with the power tool; whether a particular battery pack type is used with the power tool and/or the frequency with which the particular battery pack is used with the power tool; the type of power tool applications the power tool is frequently used for; information regarding changes in bits, blades, or other accessory devices for the power tool; and the like.

More generally, usage data for a power tool device (e.g., a power tool, a battery pack, a power tool battery charger, a power supply, a power tool pack adapter, etc.) can include summary data on the usage of the power tool device. As an example, summary data may include application classifications, statistics (e.g., use statistics), on-time, time since last use, and so on.

Maintenance data may include maintenance data for a power tool battery charger, a power tool battery, and/or a power tool. For example, maintenance data may include a log of prior maintenance, suggestions for future maintenance, and the like.

Feedback data may include data indicating the manner in which a power tool device (e.g., a battery pack and/or power tool) is put on a power tool pack adapter, such as how forcefully the power tool device is put on the power tool pack adapter, whether a prolonged force is applied when placing the power tool device on the power tool pack adapter, whether the power tool device is rapidly and repeatedly put on and taken off of the power tool pack adapter, whether the power tool device is placed on the power tool pack adapter shortly after being taken off the power tool pack adapter, and the like. For example, a bounce detector may detect if a power tool device is placed smoothly or with high speed or high force on a power tool pack adapter. While a debounce logic is usually made to avoid the bouncing characteristic of electrical contacts, the contact/disconnect/reconnect logic can be used as a feedback and/or direct command on operation of the connected power tool device and/or the power tool pack adapter. In some embodiments, the feedback data may include data associated with a charging port that has a mechanical means of detecting user force or prolonged force. For instance, a load cell, strain sensor, spring, or biased charging port with a sensing for depression may be used as feedback or a direct command to a power tool pack adapter.

Power source data may include data indicating a type of power source (e.g., AC power source, DC power source, battery power source), a type of electricity input of the power source (e.g., 120 V wall outlet, 220 V wall outlet, solar power, gas inverter, wireless charger, another power tool battery pack, another power tool battery charger, an internal battery, a supercapacitor, an internal energy storage device, a vehicle), a cost of the electricity input of the power source, and the like.

In some embodiments, the power source data can include data indicating electrical characteristics or properties of the electrical grid or circuit associated with the power source. For example, the power source data can include data indicating whether the electrical grid is balanced. As another example, the power source data can include data indicating whether circuit breakers on the electrical circuit local to the power source are likely to be tripped. For instance, the power source data may include voltage curves that can be analyzed to predict when a breaker might trip, among other uses. Additionally or alternatively, the power source data can include current and/or phase angle data, which may be analyzed to predict when a breaker might trip, among other uses. As still another example, the power source data can include data indicating other characteristics of the power source, such as when the power source supplies power in a noncontinuous manner, as may be the case for solar power, then the power source data can indicate the noncontinuous manner in which power is supplied by the power source. In these instances, the power source data can be used to optimize the charging action or use of the connected power tool device and/or the power tool pack adapter, such as by adjusting the charging rate in response to increases and decreases in the available power being supplied by the power source, throttling a power tool's output to prevent breaker trips if connected to a power supply, and the like.

Sensor data may include sensor data collected using one or more sensors (e.g., voltage sensor, a current sensor, a temperature sensor, an inertial sensor) of the power tool battery charger, battery pack, and/or power tool. For example, the sensor data may include voltage sensor data indicating a measured voltage associated with the power tool battery charger, battery pack, and/or power tool. For example, such a measured voltage may include a voltage measured across positive and negative power terminals of a power tool battery charger, battery pack, and/or power tool. Likewise, the sensor data may include current sensor data indicating a measured current associated with the power tool battery charger, battery pack, and/or power tool. For example, such a measured current may include a charging current provided from a power tool battery charger and/or received by a battery pack (e.g., at power terminals of the power tool battery charger or battery pack). Additionally, such a measured current may include a discharge current provided from a battery pack and/or received by a power tool (e.g., at power terminals of the battery pack or power tool). Additionally or alternatively, the sensor data may include temperature sensor data that indicate an internal and/or operating temperature of the power tool battery charger, battery pack, and/or power tool. In some embodiments, the sensor data can include inertial sensor data, such as accelerometer data, gyroscope data, and/or magnetometer data. These inertial sensor data can indicate a motion of the power tool battery charger, battery pack, and/or power tool, and can be processed by an electronic controller to determine a force, angular rate, and/or orientation of the power tool battery charger, battery pack, and/or power tool.

Environmental data may include data indicating a characteristic or aspect of the environment in which the power tool battery charger, battery pack, and/or power tool is located. For example, environmental data can include data associated with the weather, a temperature (e.g., external temperature) of the surrounding environment, the humidity of the surrounding environment, and the like.

Operator data may include data indicating an operator and/or owner of a power tool battery charger, a battery pack, a power tool, and the like. For example, operator data may include an operator identifier (ID), an owner ID, or both.

Location data may include data indicating a location of a power tool battery charger, a battery pack, a power tool, and the like. In some embodiments, the location data may indicate a physical location of the power tool battery charger, the battery pack, and/or power tool. For example, the physical location may be represented using geospatial coordinates, such as those determined via GNSS or the like. As another example, the physical location may be represented as a jobsite location (e.g., an address, an identification of a jobsite location) and may include a location within a jobsite (e.g., a particular floor in a skyscraper or other building under construction). In some other embodiments, the location data may indicate a location of the power tool pack adapter, power tool battery charger, battery pack, and/or power tool for inventory management and tracking. Additionally or alternatively, location data may include a unique identifier, such as a serial number, that is picked up by a reader (e.g., an optical receiver device) that then associates the reader's location (e.g., a cell phone GPS fix) with the location of the power tool device.

Figure 1B:
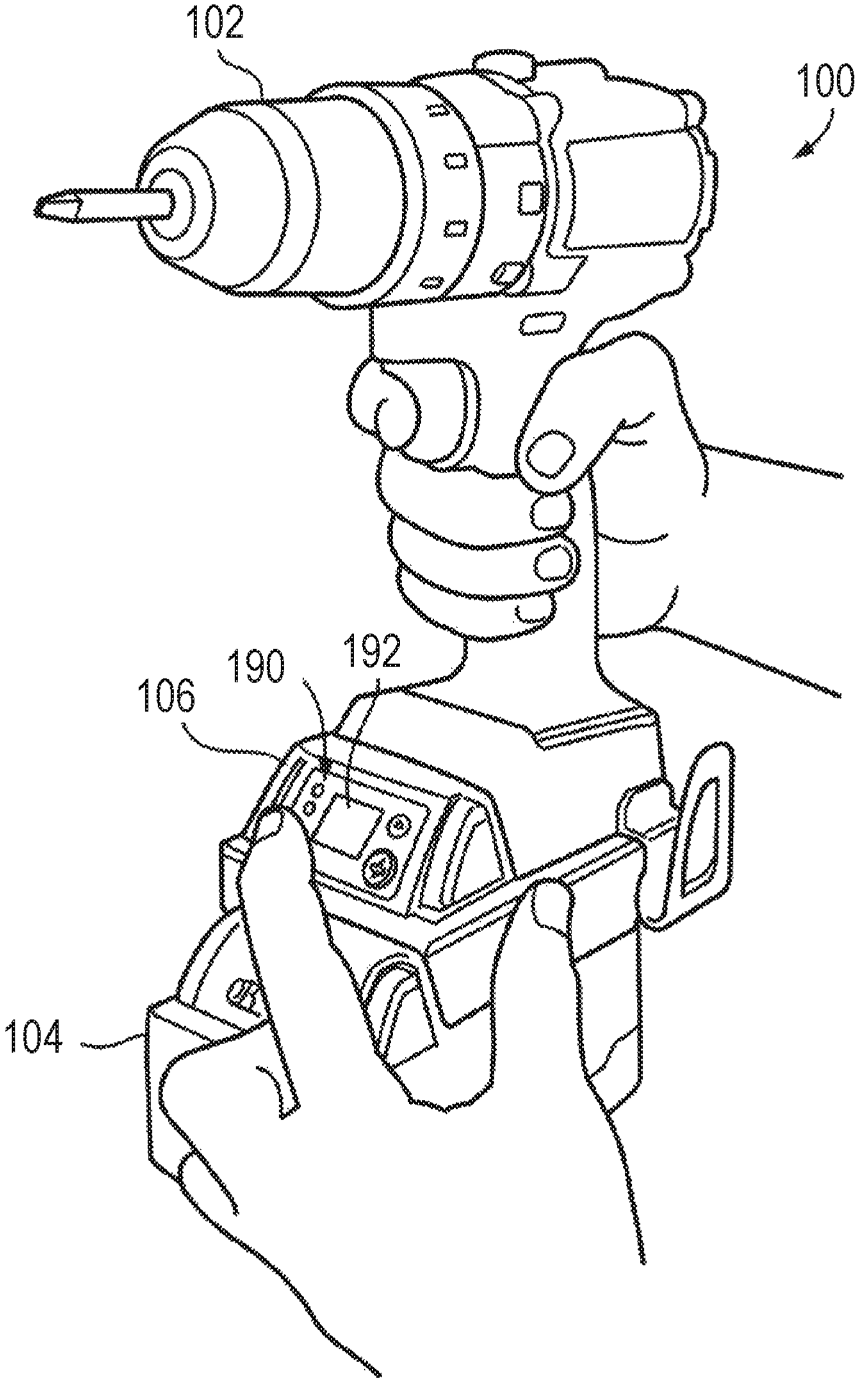
FIG. 1B illustrates another view of an example power tool system including a power tool pack adapter coupled between a power tool and a battery pack.

FIGS. 1A and 1B illustrate a power tool system 100 in accordance with some embodiments. In the illustrated example, the power tool system 100 includes a power tool 102, a battery pack 104, and a power tool pack adapter 106. In some configurations the power tool system 100 can also include one or more of a network 108, an external device 110, and a server 112.

The power tool pack adapter 106 is used to provide additional functionality to the power tool 102, which may include, among other things, machine learning control, artificial intelligence control, audio recording, audio transmission, image capture, video recording, UI control of connected power tool devices, and the like. The power tool system 100 may include more or fewer components than those illustrated in FIG. 1 and may perform functions other than those described herein.

In some embodiments, the power tool 102 and/or battery pack 104 can collect usage data or other power tool device data, such as maintenance data, feedback data, power source data, environmental data, operator data, location data, or other data. These collected or stored data can be transmitted to the external device 110 and/or the server 112 using the power tool pack adapter 106.

The power tool 102 is any motorized or non-motorized power tool device, for example, a drill-driver, a hammer drill, a rotary hammer, a miter saw, a jigsaw, a work light, a work radio, a vacuum, a dust extractor, and the like.

The battery pack 104 is any suitable battery pack used to power the power tool 102. The battery pack 104 can include one or more battery cells of various chemistries, such as lithium-ion (Li-Ion), nickel cadmium (Ni-Cad), etc. The battery pack 104 may have a nominal voltage of approximately 12 volts (between 8 volts and 16 volts), approximately 18 volts (between 16 volts and 22 volts), approximately 72 volts (between 60 volts and 90 volts), or another suitable amount. In the illustrated example, the battery pack 104 has a nominal voltage of 18 V. The battery pack 104 can further include a pack electronic controller (pack controller) including a processor and a memory. The pack controller can be configured to regulate charging and discharging of the battery cells. In some embodiments, the battery pack 104 can further include an antenna (e.g., a wireless communication device). Accordingly, in some embodiments the pack controller, and thus the battery pack 104, can be configured to wirelessly communicate with other devices, such as a power tool, a power tool battery charger, other power tool pack adapters, other power tool devices, a cellular tower, a Wi-Fi router, a mobile device, access points, etc.

The power tool 102 includes a first interface 120 (for example, a corresponding interface of the power tool) that couples to a second interface 122 of the battery pack 104 (for example, a corresponding interface of a battery pack). Particularly, the power tool 102 receives the second interface 122 of the battery pack 104 in the first interface 120 of the power tool 102.

The power tool pack adapter 106 is an adapter that is coupled between the power tool 102 and the battery pack 104. The power tool pack adapter 106 includes a third interface 124 (for example, a power tool interface) on a top surface of the power tool pack adapter 106 and a fourth interface 126 (for example, a battery pack interface) on a bottom surface of the power tool pack adapter 106. The third interface 124 is similar to the second interface 122 of the battery pack 104. The third interface 124 is received in the first interface 120 of the power tool 102 to couple the power tool pack adapter 106 to the power tool 102. The fourth interface 126 is similar to the first interface 120 of the power tool 102. The fourth interface 126 receives the second interface 122 of the battery pack 104 to couple the power tool pack adapter 106 to the battery pack 104. Accordingly, the power tool pack adapter 106 is coupled between the power tool 102 and the battery pack 104 by coupling the first interface 120 to the third interface 124 and coupling the second interface 122 to the fourth interface 126.

Similarly, the third interface 124 on the power tool pack adapter 106 can couple the power tool pack adapter 106 to a power tool battery charger or power supply by receiving the corresponding battery pack interface of the power tool battery charger or power supply. Each of the interfaces 120, 122, 124, and 126 may include one or both of electrical and mechanical interfacing elements. For example, electrical interfacing elements may include electrical terminals or contacts of one interface that are configured to mate or otherwise contact electrical terminals or contacts of another interface. Additionally, for example, mechanical interfacing elements may include structures (e.g., rail and groove elements) that are configured to physically guide and secure one interface to structures of another interface.

Figure 2A:
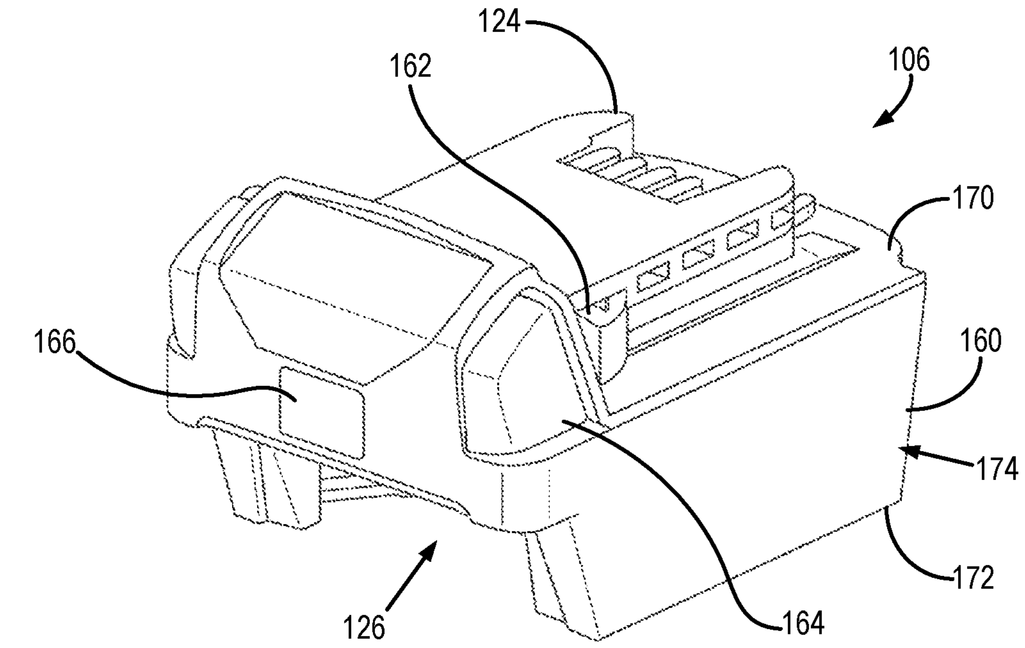
FIG. 2A shows a perspective view of an example power tool pack adapter.
Figure 2B:
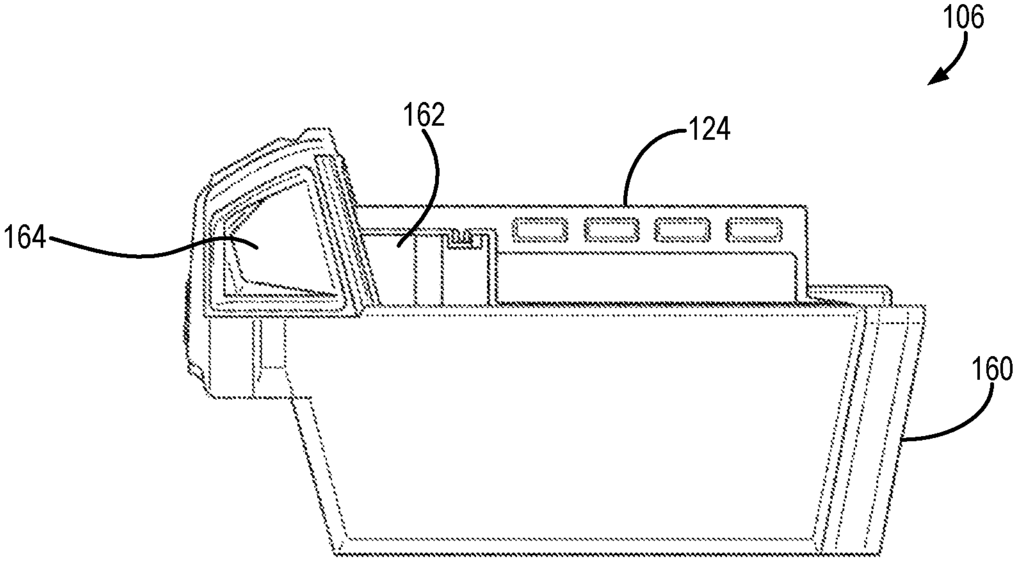
FIG. 2B shows a side view of an example power tool pack adapter.
Figure 3:
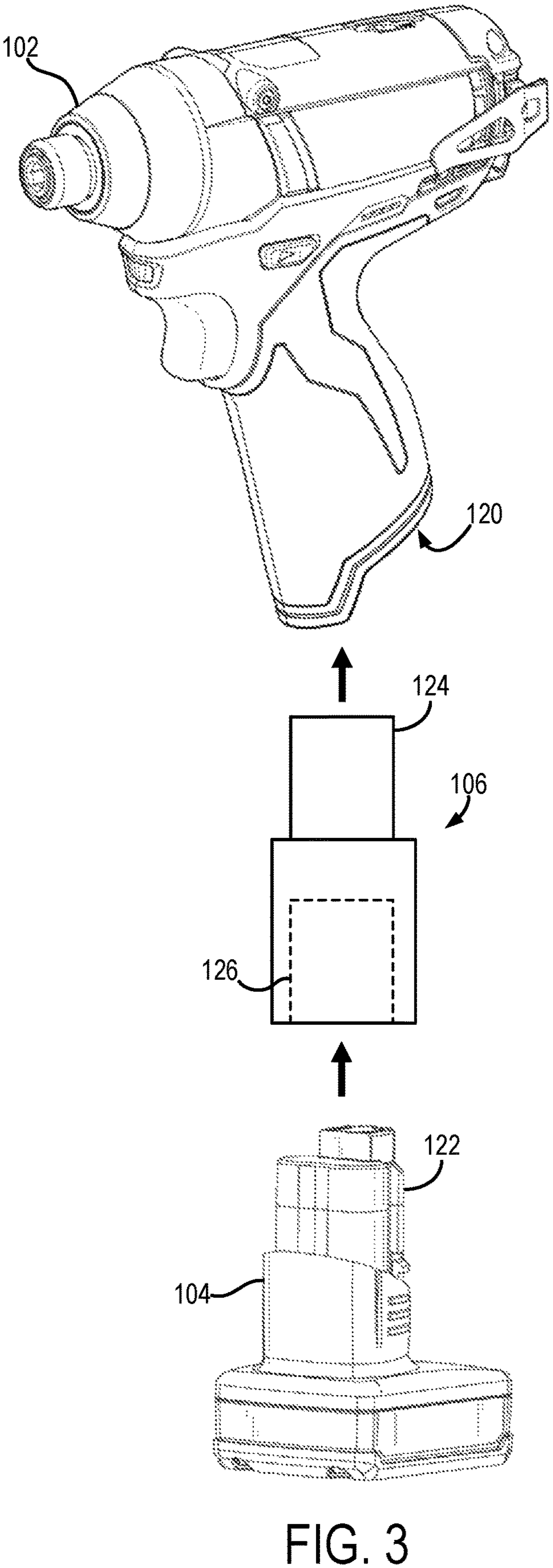
FIG. 3 shows another example of a power tool system including a power tool pack adapter having plug and sleeve interfaces.

While the interfaces 120, 122, 124, 126 of the power tool pack adapters 106 are shown as engaging with power tool devices that have rail and groove interfaces, in other embodiments the power tool pack adapters may have interfacing elements for power tool devices that involve insertion into an effective pocket or act as a sleeve, such as those illustrated in FIG. 3. In some instances, the power tool pack adapter 106 can be configured to allow a power tool device that provides power to be converted from a first nominal voltage to a second nominal voltage and/or different interface style. For example, the fourth interface 126 can be configured to receive a battery pack with a nominal voltage of 18 V and the third interface 124 can be configured to receive a power tool device (e.g., a power tool) that is normally powered by a battery pack with a nominal voltage of 12 V. In this example, the fourth interface 126 can include a rail and groove interface (e.g., as shown in FIGS. 2A and 2B) while the third interface 124 can have a plug and sleeve-based interface (e.g., as shown in FIG. 3).

The network 108 may be a long-range wireless network such as the Internet, a local area network ("LAN"), a wide area network ("WAN"), or a combination thereof. In other embodiments, the network 108 may be a short-range wireless communication network, and in yet other embodiments, the network 108 may be a wired network using, for example, USB cables. Additionally or alternatively, the network 108 may include a combination of long-range, short-range, and/or wired connections. In some embodiments, the network 108 may include both wired and wireless devices and connections. Similarly, the server 112 may transmit information to the external device 110 to be forwarded to the power tool pack adapter 106.

In some embodiments, the power tool pack adapter 106 communicates directly with the external device 110. For example, the power tool pack adapter 106 can transmit data (e.g., usage data and other power tool device data received by the power tool pack adapter 106 from the power tool 102) and settings to the external device 110. Similarly, the power tool pack adapter 106 can receive data (e.g., settings, firmware updates, etc.) from the external device 110.

In some other embodiments, the power tool pack adapter 106 bypasses the external device 110 to access the network 108 and communicate with the server 112 via the network 108. In some embodiments, the power tool pack adapter 106 is equipped with a long-range transceiver instead of or in addition to a short-range transceiver. In such embodiments, the power tool pack adapter 106 communicates directly with the server 112 or with the server 112 via the network 108 (in either case, bypassing the external device 110). In some embodiments, the power tool pack adapter 106 may communicate directly with both the server 112 and the external device 110. In such embodiments, the external device 110 may, for example, generate a graphical user interface to facilitate control and programming of the power tool 102, the battery pack 104, and/or the power tool pack adapter 106, while the server 112 may store and analyze larger amounts of operational data for future programming or operation of the power tool 102, the battery pack 104, and/or the power tool pack adapter 106. In other embodiments, however, the power tool pack adapter 106 may communicate directly with the server 112 without utilizing a short-range communication protocol with the external device 110.

In the illustrated embodiment, the power tool pack adapter 106 communicates with the external device 110. The external device 110 may include, for example, a smartphone, a tablet computer, a cellular phone, a laptop computer, a smart watch, and the like. The power tool pack adapter 106 communicates with the external device 110, for example, to transmit at least a portion of the usage information or other power tool device data received by the power tool pack adapter 106 from the power tool 102 and/or battery pack 104. In some embodiments, the external device 110 may include a short-range transceiver to communicate with the power tool pack adapter 106, and a long-range transceiver to communicate with the server 112. In the illustrated embodiment, power tool pack adapter 106 can also include a transceiver to communicate with the external device 110 via, for example, a short-range communication protocol such as Bluetooth® or Wi-Fi®. In some embodiments, the external device 110 bridges the communication between power tool pack adapter 106 and the server 112. For example, power tool pack adapter 106 may transmit data to the external device 110, and the external device 110 may forward the data from power tool pack adapter 106 to the server 112 over the network 108.

In some embodiments the power tool pack adapter 106 can act as a node in a mesh network. The mesh network may involve other power tool devices (such as other power tool pack adapters, battery packs, power tool battery chargers, power tools, external devices, hubs, etc.). In some other embodiments, the power tool pack adapter 106 may not have any communication with the external device 110 and/or server 112. In these instances, the power tool pack adapter 106 can process input received by user interaction with the power tool pack adapter 106 (e.g., via one or more UI elements on the housing of the power tool pack adapter 106), by voice command, and so on.

The server 112 includes a server electronic control assembly having a server electronic processor 150, a server memory 152, and a transceiver 154. The transceiver 154 allows the server 112 to communicate with power tool pack adapter 106, the external device 110, or both. The server electronic processor 150 receives usage data and/or other power tool device data from the power tool 102 and/or battery pack 104 (e.g., via the power tool pack adapter 106), and stores the received usage data and/or other power tool device data in the server memory 152. The server 112 may maintain a database (e.g., on the server memory 152) for containing power tool device data, trained machine learning controls (e.g., trained machine learning model and/or algorithms), artificial intelligence controls (e.g., rules and/or other control logic implemented in an artificial intelligence model and/or algorithm), and the like. In some embodiments, the server electronic processor 150 can use the received usage data and/or other power tool device data for constructing, training, adjusting, or executing a machine learning controller (e.g., machine learning controller 210 shown in FIG. 13). That is, the machine learning controller may be software or a set of instructions executed by the server processor 150 to implement the functionality of the machine learning controller 210 described herein. In some examples, the machine learning controller 210 includes a separate processor and memory to execute the software or instructions to implement the functionality of the machine learning controller 210 described herein.

Although illustrated as a single device, the server 112 may be a distributed device in which the server electronic processor and server memory are distributed among two or more units that are communicatively coupled (e.g., via the network 108).

FIGS. 2-11 illustrate views of different implementations of the power tool pack adapter 106. As shown in FIGS. 1A and 1B, the power tool pack adapter 106 is configured to couple to both the power tool 102 and the battery pack 104 (or other power tool devices). In some embodiments, the power tool pack adapter 106 is also configured to couple to a power tool battery charger or a power supply. The power tool pack adapter 106 couples to different power tool devices (e.g., the power tool 102, the battery pack 104, power tool battery chargers, power supplies, other power tool devices) to, among other functions, export information from the connected power tool devices, import information into the connected power tool devices, and control operation of the connected power tool devices (e.g., by adjusting control settings of the connected power tool devices via voice control, UI elements, etc.).

The power tool pack adapter 106, for example, obtains and exports usage data, maintenance data, mode information, drive device information, other power tool device data, and the like from the power tool 102, battery pack 104, or other connected power tool device. The power tool pack adapter 106 also imports (i.e., provides) information into the power tool 102, battery pack 104, and/or other power tool device (e.g., configuration data, operation thresholds, maintenance thresholds, mode configurations, programming for the connected power tool device(s), and the like). In general, the power tool pack adapter 106 creates a communication path between the power tool 102, the battery pack 104, and/or other connected power tool devices and the external device 110, server 112, and/or other power tool devices (e.g., other power tools, battery packs, power tool battery chargers, power tool pack adapters) in a power tool device network.

As an example, a power tool pack adapter 106 can communicate updates to a power tool 102, battery pack 104, or other connected power tool device via bootloader pins when the power tool pack adapter 106 is coupled to the respective power tool device or devices.

Referring to FIGS. 2A and 2B, the power tool pack adapter 106 includes a housing 160, which may be an integrally formed housing or may be composed of two or more housing parts (e.g., a first and second half-housing) that are joined or otherwise coupled together. The housing 160 includes a top side 170, a bottom side 172, and one or more sidewalls 174 connecting the top side 170 and the bottom side 172. The third interface 124 is provided on the top side 170 of the housing 160 and the fourth interface 126 is provided on a bottom side 172 of the housing 160.

In some embodiments, an identification tag can be coupled to the housing 160 (e.g., on a bottom surface of the housing, on a flat portion of the housing 160). The identification tag may include a quick response ("QR") code, a barcode, a radio frequency identification ("RFID") tag, a near-field communication ("NFC") tag, a name tag, or the like.

Figure 8:
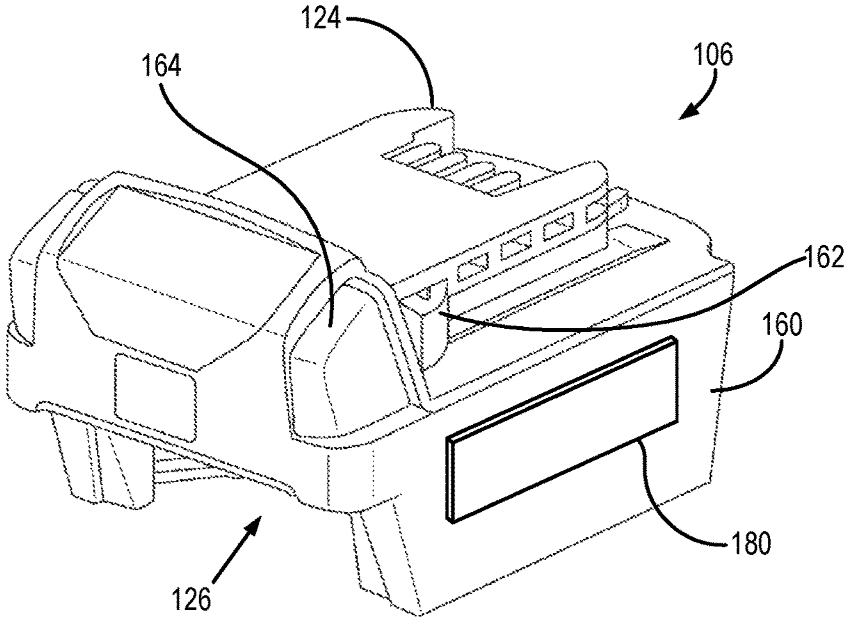
FIG. 8 shows an example power tool pack adapter having a magnetic edge for securing a case, fasteners, or the like to the housing of the power tool pack adapter.

In some other embodiments, the housing 160 may have one or more magnetic edges, such as a magnetic edge 180 coupled to a sidewall 174 of the housing 160, as shown in FIG. 8. The magnetic edge 180 can allow for the power tool pack adapter 106 to be mounted to magnetic surfaces (e.g., magnetic metallic surfaces) and/or to hold accessories and/or fasteners (e.g., screws) by magnetically coupling the accessories and/or fasteners to the magnetic edge 180 of the housing 160.

Additionally or alternatively, a holder 182 and/or case can be coupled to the housing 160 of the power tool pack adapter 106 in order to hold accessories and/or fasteners. For example, the holder 182 can be implemented as one or more modular clips that can be provided on the housing 160 (e.g., on the sidewall 174 of the housing 160) and the modular clip(s) can receive one or more holders, cases, or other accessories. In some configurations, the holder 182 can be a tool holder, which may include a large loop area for securing tools. In some configurations, the holder may be a tube clip or adapter (e.g., for receiving a vacuum hose tube), which may facilitate holding a tube in a particular placement relative to a work surface. In some other examples, the holder 182 may be magnetic, which can facilitate holding fasteners, drill bits, and other such small metallic objects.

In still other embodiments, the housing 160 may also include a clamp coupled to the housing 160. Additionally or alternatively, a clip can be coupled to the housing 160 to enable users to carry the power tool pack adapter 106 on a tool belt.

Figure 9:
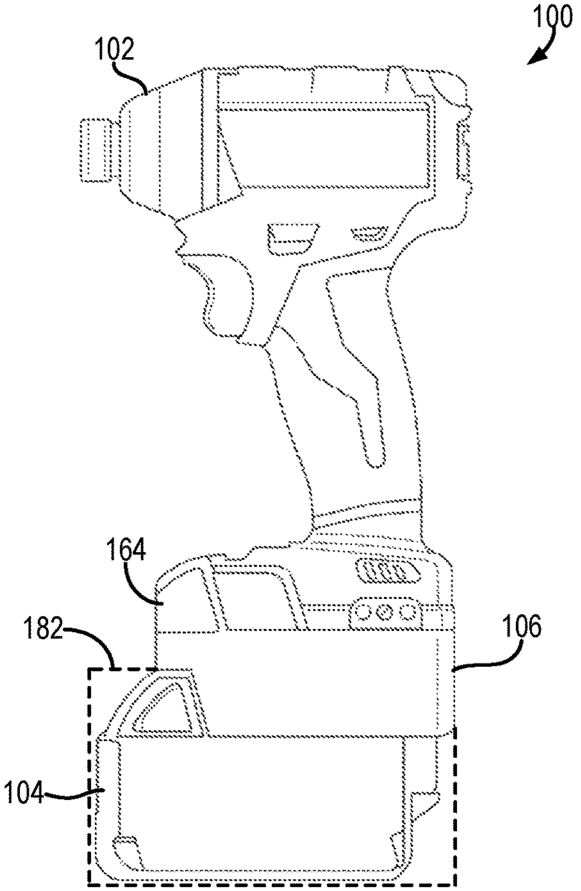
FIG. 9 shows an example power tool system including a power tool pack adapter coupled between a power tool and a battery pack, where the power tool pack adapter includes an enclosure for receiving the battery pack.

As shown in FIG. 9, the housing 160 may, in some embodiments, include an additional compartment or enclosure 182 on the bottom side 172 of the housing 160, such that the battery pack 104 can be received by the power tool pack adapter 106 and retained in the compartment or enclosure 182. The additional compartment or enclosure 182 can be a water-tight enclosure. Such configurations can be advantageous for protecting the connected battery pack 104 from water (e.g., rain in outdoor power equipment ("OPE") applications), grease (e.g., in automotive applications), or other fluids. Additionally or alternatively, the additional compartment or enclosure 182 can be temperature regulated (e.g., via a heater, cooler, fan, or the like). Such configurations can be advantageous for heating or cooling the compartment when the battery pack 104 is coupled to the power tool pack adapter 106. The additional compartment or enclosure can also provide an anti-spark protection for the connected battery pack 104, which can be advantageous when charging the battery pack 104 in enclosed spaces.

Figure 4:
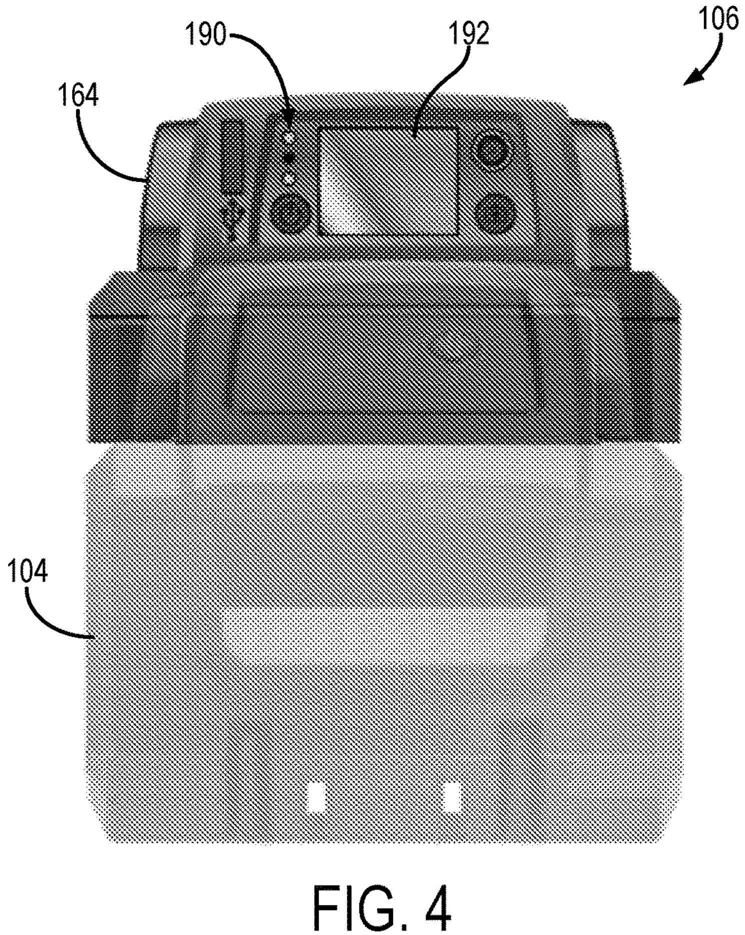
FIG. 4 shows a front view of an example power tool pack adapter in a front-loading configuration.
Figure 5:
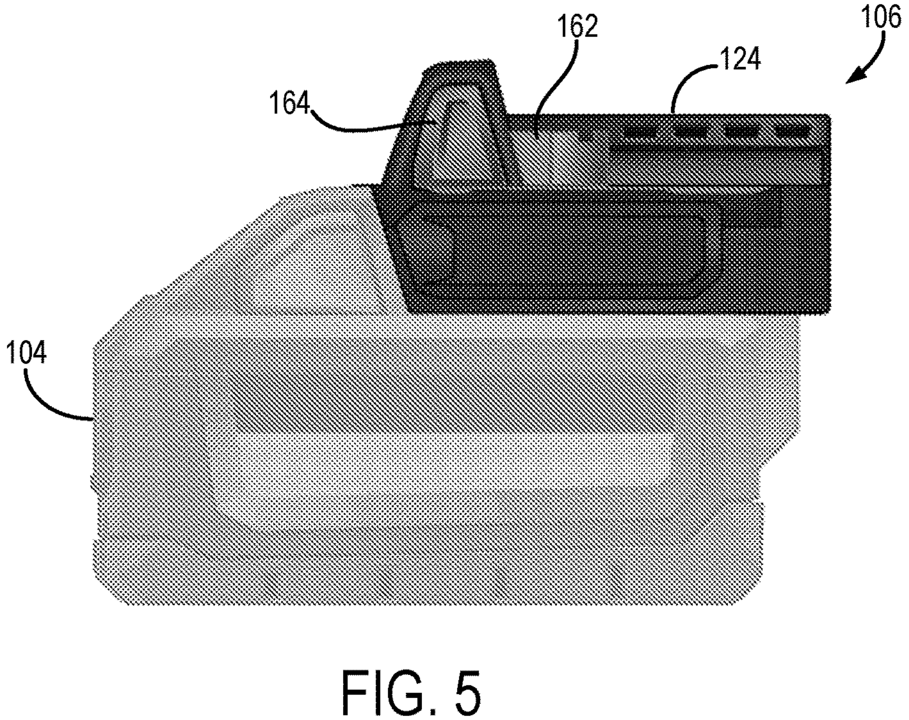
FIG. 5 shows a side view of an example power tool pack adapter in a front-loading configuration.
Figure 6:
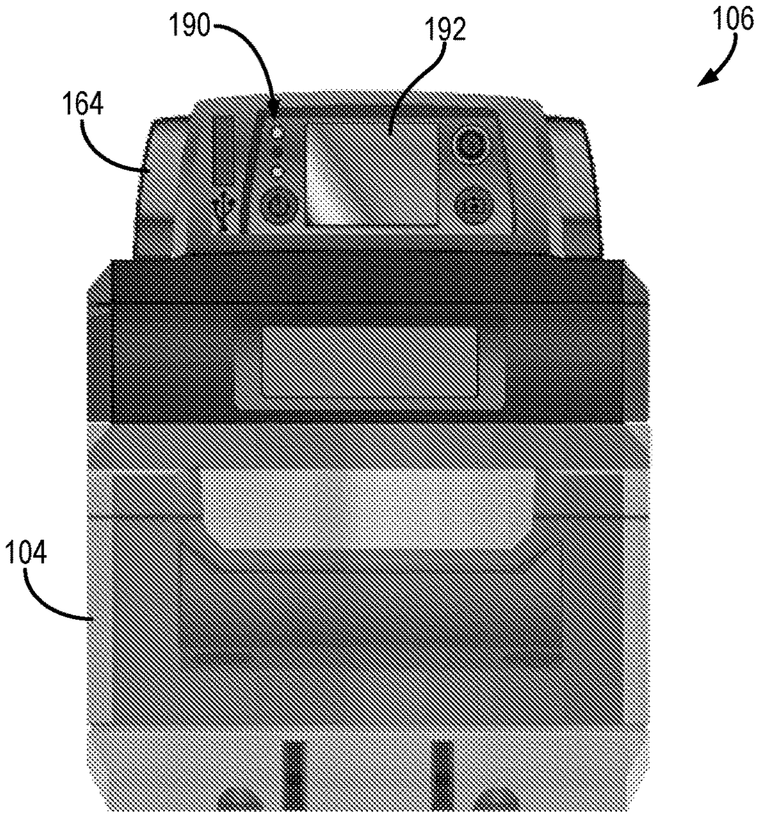
FIG. 6 shows a front view of an example power tool pack adapter in a rear-loading configuration.
Figure 7:
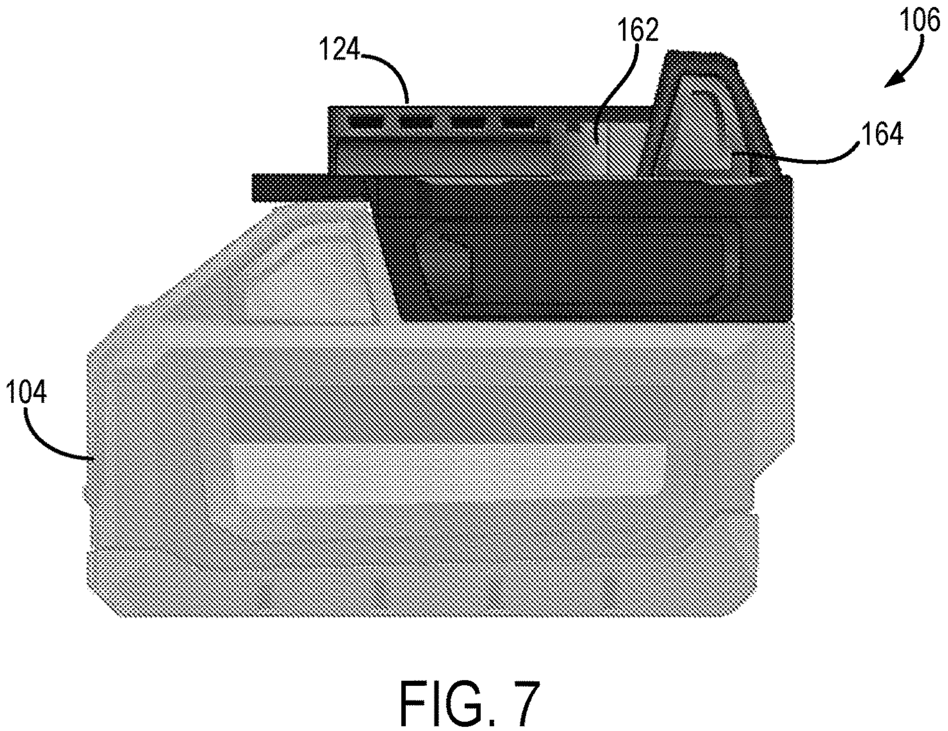
FIG. 7 shows a side view of an example power tool pack adapter in a rear-loading configuration.

The power tool pack adapter 106 includes a latch 162 provided on each of the left and right sides of the third interface 124. Each of the latches 162 engages a corresponding projection on the first interface 120 of the power tool 102 to prevent the power tool pack adapter 106 from sliding off the power tool 102 when the power tool pack adapter 106 is coupled to the power tool 102. The latches 162 can be actuated by push buttons 164. As an example, the push buttons 164 can be provided on a front side of the housing 160 to the front of the third interface 124 (as shown in FIGS. 4 and 5). As another example, the push buttons 164 can be provided on a rear side of the housing 160 to the rear of the third interface 124 (as shown in FIGS. 6 and 7). The push buttons 164 are integrally connected, respectively, to the latches 162 inside the housing 160 such that the latches 162 move inward when the respective push button 164 is pressed to release the power tool pack adapter 106 from the power tool 102. In some examples, the push buttons 164 and the latches 162 can be spring-biased outward.

The power tool pack adapter 106 also includes a locking mechanism 166, which may be provided on the front side of the housing 160 or the rear side of the housing 160. The locking mechanism 166 adds additional security to the power tool pack adapter 106. For example, the locking mechanism 166 can include a front plate and a blocking post that extends orthogonal to the front plate. When the locking mechanism 166 is fixed to the power tool pack adapter 106, the blocking post extends between the push buttons 164 to prevent the push buttons 164 from being actuated (i.e., pressed inward). The locking mechanism 166 therefore prevents the power tool pack adapter 106 from being decoupled from the power tool 102. The blocking post is sized large enough to prevent depression of the push buttons 164 enough to disengage the latches 162 from the corresponding projections on the power tool 102, but small enough that the latches 162 (which are formed integrally with the push buttons 164) can be pushed inward when the power tool pack adapter 106 is being coupled to the power tool 102 to enable the engagement of the power tool pack adapter 106 to the power tool 102.

The locking mechanism 166 can be fixed to the power tool pack adapter 106 with one or more fasteners. In these instances, the locking mechanism 166 can be selectively attached to the power tool pack adapter 106. Thus, in some embodiments, the power tool pack adapter 106 is provided without the locking mechanism 166 and the power tool pack adapter 106 is coupled to the power tool 102 without the locking mechanism 166 in place. In some embodiments, the locking mechanism 166 can also be similarly provided to a latch mechanism of the battery pack 104 to lock the battery pack 104 to the power tool pack adapter 106, the power tool 102, a power tool battery charger, and/or other power tool device that can be coupled to the battery pack 104 by the second interface 122.

In some embodiments, the fourth interface 126 of a power tool pack adapter 106 can receive the third interface 124 of another power tool pack adapter 106. When connected together, the power tool pack adapters can share settings or other data. For example, the power tool pack adapters can share a user voice profile for voice commands (e.g., VoiceID). Other settings and data can also be shared between the power tool pack adapters when connected.

Additionally or alternatively, multiple power tool pack adapters 106 can share settings and/or other data wirelessly. Communication between power tool pack adapters 106 can also be useful for noise cancelling (e.g., by sampling environmental noise using microphones in a network of power tool pack adapters) and/or providing spatial awareness of the power tool pack adapters and connected power tool devices.

In some embodiments, metal inserts and/or other vibration dampening can be provided on the rails of the third interface 124 and/or the fourth interface 126 in order to reduce or otherwise dampen vibrations in the power tool pack adapter 106 when the power tool pack adapter 106 is coupled to a power tool 102 that is being operated. For example, vibration dampening can be implemented by flexible members on the rails or other members of the third interface 124 and/or the fourth interface 126, by using rubber contact points on the third interface 124 and/or the fourth interface 126, and so on.

Figure 10:
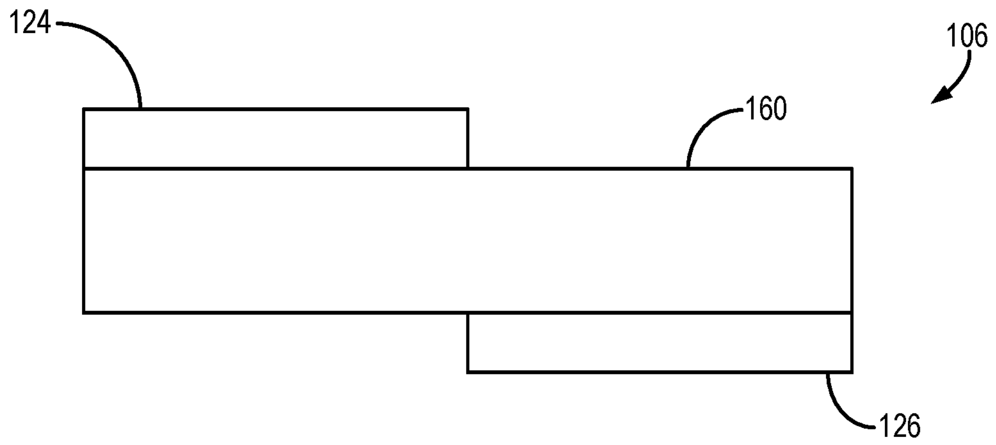
FIG. 10 shows an example of a power tool pack adapter having laterally offset power tool device interfaces.

In some configurations, the housing 160 of the power tool pack adapter 106 is designed such that the third interface 124 and the fourth interface 126 are offset relative to each other (e.g., laterally offset). For example, as shown in FIG. 10, the fourth interface 126 can be laterally offset relative to the third interface 124 such that the power tool 102 and battery pack 104 can fit into a limited or otherwise restricted space better than if the power tool 102 and battery pack 104 were aligned.

Figure 11:
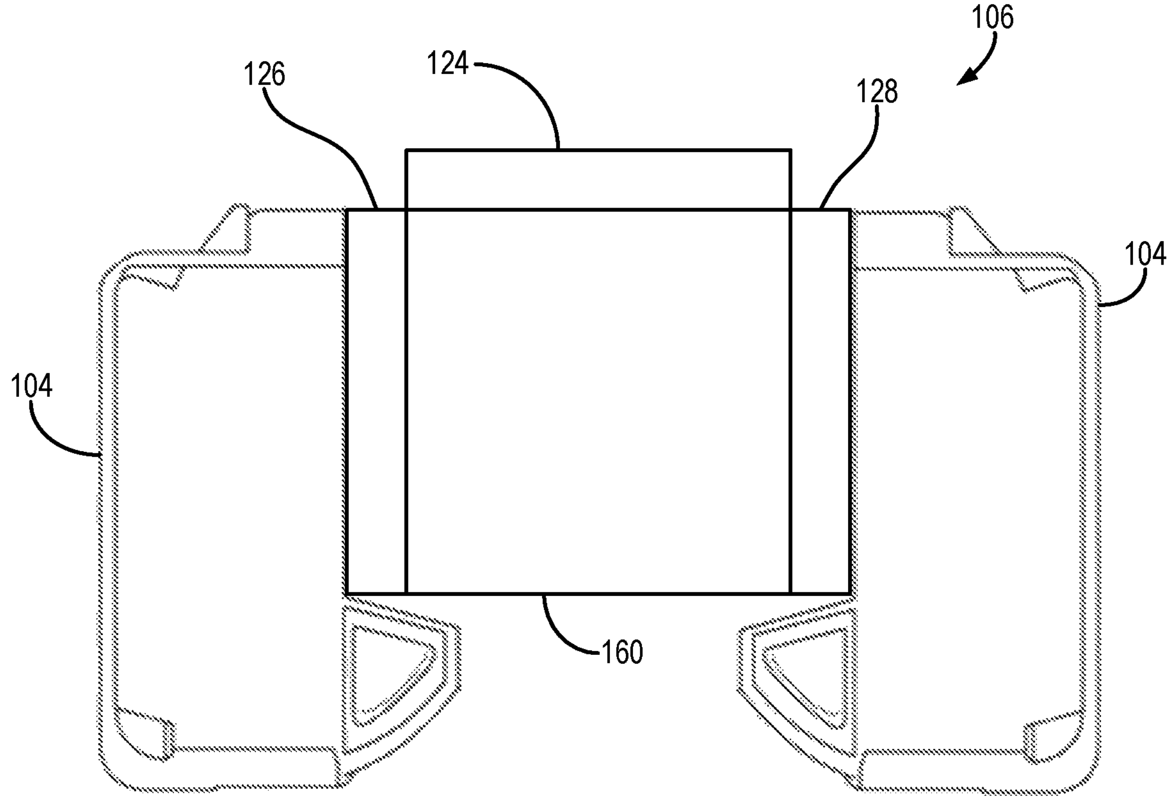
FIG. 11 shows an example power tool pack adapter having two battery pack interfaces in addition to a power tool interface.

In some embodiments, the power tool pack adapter 106 can include a fifth interface 128 similar to the fourth interface 126, which enables an additional battery pack to be coupled to the power tool pack adapter 106 to provide additional operating power to the connected power tool 102. An example configuration is shown in FIG. 11. In some configurations, the power tool pack adapter 106 can switch between the connected battery packs to provide power to the power tool 102. For example the electronic processor 230 of the power tool pack adapter 106 can selectively control which battery pack is providing power to the power tool 102. In some configurations, the user can manually select which battery pack to provide operating power to the power tool 102 (e.g., using a UI element on the input(s) 290 of the pack adapter 106, which may include a switch, selector wheel, or the like). Additionally or alternatively, the power tool pack adapter 106 can be configured to provide operating power to the power tool 102 from both connected battery packs, which in some configurations may include having a transformer in the power tool battery pack 106 that is configured to keep the power tool 102 at a higher voltage.

Figure 12A:
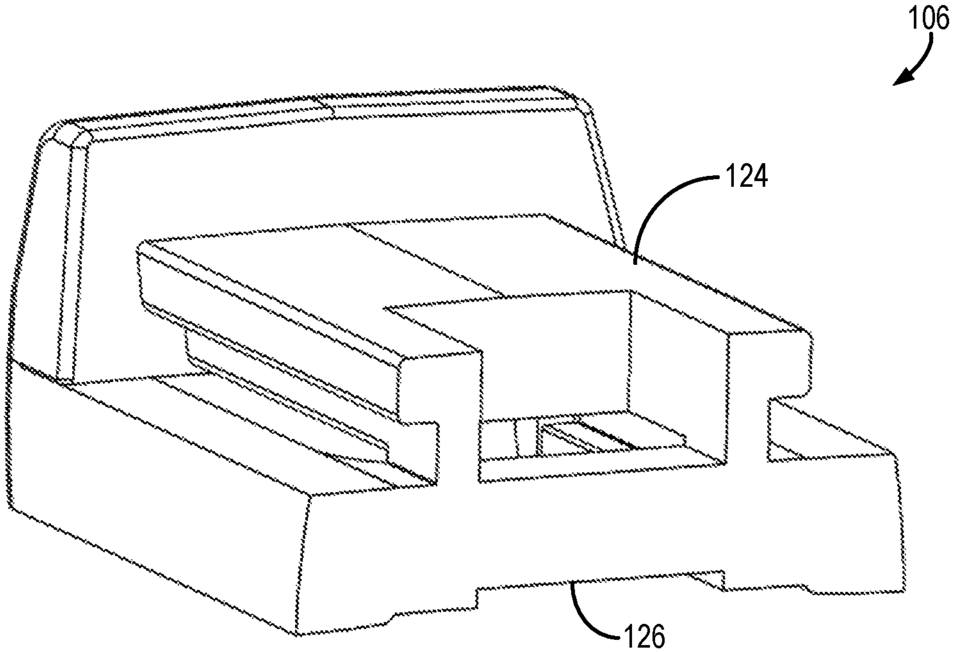
FIG. 12A shows a perspective view of an example power tool pack adapter having a reduced vertical profile.
Figure 12B:
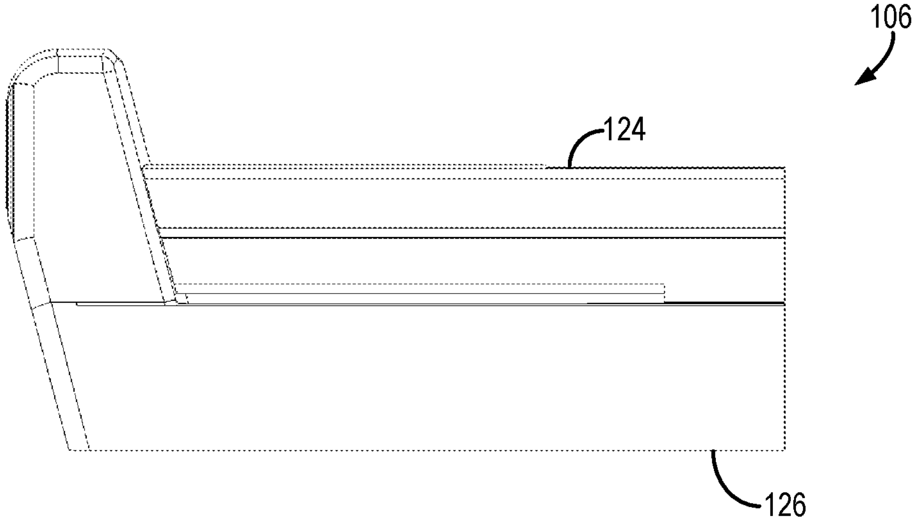
FIG. 12B shows a side view of an example power tool pack adapter having a reduced vertical profile.

As shown in FIGS. 12A and 12B, in some configurations the power tool pack adapter 106 can take a form to minimize the added vertical height standoff of the battery pack and power tool pack adapter 106. In this configuration, the connected power tool devices (e.g., a connected power tool, a connected battery pack) can touch or nearly touch due to physical gaps in the power tool pack adapter 106. The reduced vertical height improves the form factor of the power tool pack adapter 106, and also can reduce mass.

Metal components or inserts (not shown) can be used to provide additional rigidity with the reduced adapter body. Terminal blocks (not shown), which may in some embodiments be united as a single piece especially for power pass throughs, can also be arranged within the housing of the reduced power tool pack adapter 106. Similarly, locking engagements, such as those described above, and other UI elements can also be incorporated into the reduced power tool pack adapter 106 design.

In some embodiments, the power tool pack adapter 106 communicates other data to, or receives other data from, the external device 110, the server 112, or both. For example, the power tool pack adapter 106 can send and receive data associated with tool usage notifications, which can notify a site supervisor or other person in management that the power tool pack adapter is live and in use. As an example, the power tool pack adapter 106 can create a positive identification to the site supervisor that the power tool pack adapter 106 is being used and not being over-ridden. This functionality can prevent a user from removing the power tool pack adapter 106 and being able to over-ride a safety and/or security feature (e.g., a PPE mandate or similar safety function and/or inspection function). The power tool pack adapter 106 can verify (e.g., via camera(s)) that the user is wearing appropriate PPE or using a side handle. These and other notifications can be synced with the external device 110 (e.g., when the external device 110 is a smartphone the notifications can be delivered as text messages, app notifications, or other phone message alerts and/or calls).

In some embodiments, a power tool device (e.g., power tool 102 and/or battery pack 104) can be in a locked state when the power tool pack adapter 106 is not coupled to the power tool device. The power tool device can then be unlocked (e.g., made operable) by either bringing the power tool pack adapter 106 near to the power tool device or by connecting the power tool adapter 106 to the power tool device (e.g., by receiving the power tool device in either the third interface 124 or the fourth interface 126). For example, in these scenarios, the power tool pack adapter 106 may communicate a key or password to the power tool device, and a controller of the power tool device may compare the received key or password to a stored key or password. In the event of a match, the controller of the power tool device may unlock the power tool device. A particular power tool device can be synced or otherwise associated with more than one power tool pack adapter 106, such that more than one power tool pack adapter 106 can be used to unlock the power tool device.

In some embodiments, the power tool device can be "bricked" (e.g., rendered inoperable by communicating a lock command to the power tool device or intentionally blowing a fuse of the power tool device through a surge of current) by the power tool pack adapter 106 if the power tool pack adapter 106 is improperly removed. These functionalities can advantageously provide for security at retail stores, in warehouses, on jobsites, or for rented power tool devices. The power tool device can be unlocked by a user using the power tool adapter 106 (e.g., via an external device 110 such as a smartphone, or the like).

In some uses, the power tool pack adapter 106 can be synced with a vacuum or blower so that the vacuum or blower activates automatically when a power tool is activated. For example, a power tool pack adapter 106 can be coupled to a table saw and, when the table saw is activated, the power tool pack adapter 106 can detect the activation and wirelessly control operation of a vacuum for sawdust collection simultaneous with the operation of the table saw.

A power tool pack adapter 106 can alternatively cause a vacuum, blower, or other noisy power tool device (e.g., a radio) to briefly become silent or to turn off, such as when the power tool pack adapter 106 enters a "listen" mode to receive voice commands from a user. Alternatively, the LEDs or work lights on other power tool devices in a network of power tool devices can flash so people know to be quieter.

Figure 13:
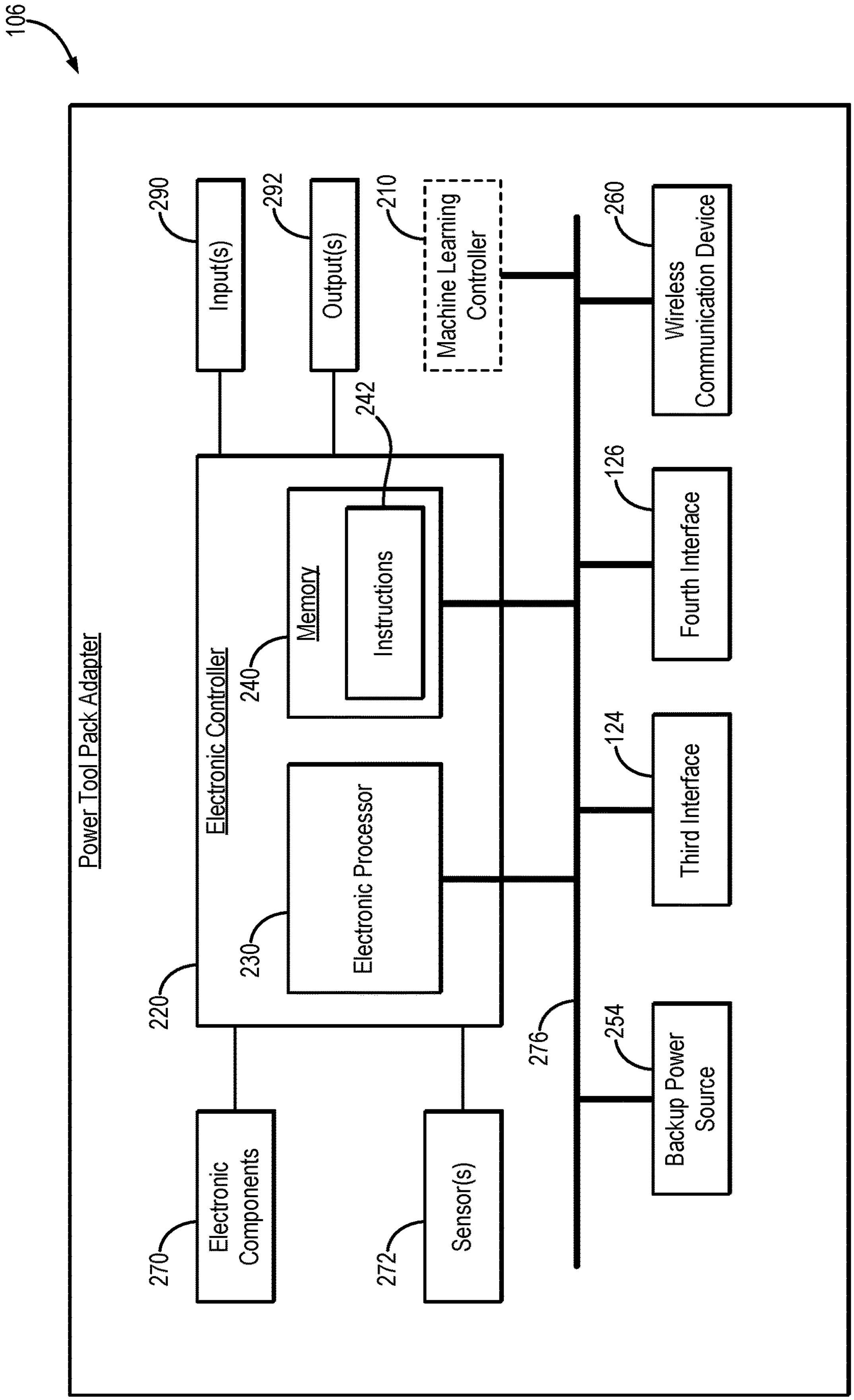
FIG. 13 is a block diagram of an example power tool pack adapter according to some embodiments described in the present disclosure.

FIG. 13 shows a block diagram of an example power tool pack adapter 106. The power tool pack adapter 106 includes an electronic controller 220, an optical transmitter 250, a main power source 252 (e.g., a battery pack, a portable power supply, and/or a wall outlet), etc. In the illustrated embodiment, the power tool pack adapter 106 also includes a backup power source 254 (e.g., a coil cell battery) and a wireless communication device 260. In other embodiments, the power tool pack adapter 106 may not include a backup power source 254. Similarly, in some embodiments, the power tool pack adapter 106 may not include a wireless communication device 260.

The electronic controller 220 can include an electronic processor 230 and memory 240. The electronic processor 230, the memory 240, and the optical transmitter 250 can communicate over one or more control buses, data buses, etc., which can include a device communication bus 276. The control and/or data buses are shown generally in FIG. 13 for illustrative purposes. The use of one or more control and/or data buses for the interconnection between and communication among the various modules, circuits, and components would be known to a person skilled in the art.

The electronic processor 230 can be configured to communicate with the memory 240 to store data and retrieve stored data. The electronic processor 230 can be configured to receive instructions 242 and data from the memory 240 and execute, among other things, the instructions 242. In particular, the electronic processor 230 executes instructions 242 stored in the memory 240. Thus, the electronic controller 220 coupled with the electronic processor 230 and the memory 240 can be configured to perform the methods described herein (e.g., the process 1400 of FIG. 14).

The electronic processor 230 can in some configurations compute or otherwise sense depth between the power tool pack adapter 106 (and/or connected power tool device(s)) and a work object. For example, the electronic processor 230 can estimate depth using a time-of-flight measurement based on IR light generated by output(s) 292, or the like. For example, the estimated depth can indicate depth of a drilling operation of a power tool device coupled to the power tool pack adapter 106. In other configurations, the pack adapter 106 may have sensors 272 that include distance and/or positional sensors such a lidar, sonar, etc. In these instances, simultaneous localization and mapping ("SLAM") and other mapping techniques can help identify the location of the workpiece, content of the power tool 102, attached power tool device components, information about a bit or fastener, user information, and so on. For instance, a 3D point map of a user's face can be recorded using the sensors 272 and used for facial recognition of the user.

The memory 240 can include read-only memory ("ROM"), random access memory ("RAM"), other non-transitory computer-readable media, or a combination thereof. The memory 240 can include instructions 242 for the electronic processor 230 to execute. The instructions 242 can include software executable by the electronic processor 230 to enable the electronic controller 220 to, among other things, receive data and/or commands, transmit data, control operation of a connected power tool device, and the like. The software can include, for example, firmware, one or more applications, program data, filters, rules, one or more program modules, and other executable instructions.

The electronic processor 230 is configured to retrieve from memory 240 and execute, among other things, instructions related to the control processes and methods described herein. The electronic processor 230 is also configured to store data on the memory 240 including usage data (e.g., usage data of the power tool 102, battery pack 104, or other power tool device), maintenance data (e.g., maintenance data of the power tool 102, battery pack 104, or other power tool device), feedback data, power source data, sensor data (e.g., maintenance data of the power tool 102, battery pack 104, or other power tool device), environmental data, operator data, location data, and the like.

Additionally, the electronic processor 230 can also be configured to store other data on the memory 240 including information identifying the type of power tool 102, battery pack 104, or other power tool device; a unique identifier for the particular e.g., maintenance data of the power tool 102, battery pack 104, or other power tool device; user characteristics (e.g., identity, trade type, skill level), and other information relevant to operating or maintaining the e.g., maintenance data of the power tool 102, battery pack 104, or other power tool device (e.g., received from an external source, such as the external device 110 or pre-programed at the time of manufacture). For example, other data that may be collected by, or otherwise stored on, the memory 240 can include tool name data (e.g., a custom tool name, a standard tool name, a tool model, a tool type), an owner name, key settings, key diagnostics, key analytics (e.g., number of users, whether the power tool device has been subject to heavy or light use), warranty information, error codes, security messages, unique tool identifiers (e.g., a serial number or ID), histograms or other statistics of a parameter (e.g., maximum currents, maximum temperatures, durations of use), sequential statistics of one or more tool runs (e.g., duration, power, and time of a tool run), classifications or regressions associated with one or more tool runs (e.g., classification of what application a tool was used for, regression of output torque, etc.), raw or processed data from one or more tool runs, an encrypted message containing any of the aforementioned data types, a qualitative representation of an aspect of a power tool (e.g., frequent or rare use), a warning (e.g., an indication that the tool has been dropped), a request for service, the time since last use, a state of charge (e.g., for battery packs), an indication that the power tool device is in need for repair, a verification that the power tool device has been updated to the same firmware (e.g., same blinking pattern), and/or a security key.

In some embodiments, the extra memory provided by the power tool adapter 106 memory 240 can have extra features and/or models. For example, the memory 240 can store instructions that enable a connected power tool 102, battery pack 104, or other power tool device to make use of sensors 272, inputs 290, outputs 292, or other electronic components 270 of the power tool pack adapter 106. Additional modes on the power tool pack adapter 106 can be purchased by a user (e.g., using the external device 110 or input(s) 290) to program or customize the power tool adapter 106 and/or one or more power tool devices to which the power tool adapter 106 may be coupled.

The power tool pack adapter 106 receives electrical power from the battery pack 104 when coupled to the power tool pack adapter 106, and optionally from a backup power source 254 or an external power source (e.g., a wall outlet when the power tool pack adapter 106 is coupled to a power tool battery charger, other power supply, or other source of power such as a USB port).

In some embodiments, the backup power source 254 is a coin cell battery. The coin cell battery is removable from the power tool pack adapter 106 and is, therefore, located in an accessible area of the power tool pack adapter 106. In many embodiments, the backup power source 254 is accessed and replaced by the user/operator of the power tool pack adapter 106. In other embodiments, however, the backup power source 254 is located in a hard-to-access portion of the power tool pack adapter 106 and is replaced by a professional serviceperson. For instance, rather than being located in a dedicated battery recess accessible via a sliding or removable door on the power tool device housing, the backup power source 254 may require opening the housing 160 of the power tool pack adapter 106 using one or more tools.

In some embodiments, the backup power source 254 can be a rechargeable power source. The rechargeable power source can be recharged by a battery (e.g., when the battery pack 104 is connected to the power tool pack adapter 106) or by a power tool battery charger or power supply when connected to the power tool pack adapter 106. As an example, the rechargeable power source can be a rechargeable battery, such as a lithium ion battery.

In some embodiments, the backup power source 254 can implement an energy-harvesting circuit to keep a back-up battery charged. For example, piezo/motion can be used for energy harvesting to recharge the backup power source 254. In some other examples, the power tool pack adapter 106 may modify or augment the power supplied to the power tool 102 or other connected power tool device. For instance, the power tool pack adapter 106 may have a super capacitor or internal battery that, with regulation, can provide additional power on demand to the power tool 102 or other connected power tool device. Additionally or alternatively, the power tool pack adapter 106 may utilize other circuitry such as boost or buck converters to change a voltage or current provided to the power tool 102 or other connected power tool device. The power tool pack adapter 106 may also be used to help engage with one or more styles of batteries and/or one or more styles of power tool device engagements. For instance, while the power tool pack adapter 106 shown in FIG. 3 uses a female form factor, whereas the power tool pack adapter 106 shown in FIG. 1A uses a rail form factor. The power tool pack adapter 106 can support engaging with multiple types of power tool device physical engagements, and associated circuitry can allow for electrical suitability. For instance, a nominal 12 V battery may be used with a power tool 102 or other power tool device expecting nominally 18 V by providing a boosting circuit internal to the power tool pack adapter 106. In some examples, the power tool pack adapter 106 may also have electrical fuses that prevent damage to the power tool 102 or other connected power tool devices. The power tool pack adapter 106 may also have one or more sensors 272 that measure current and/or voltage, and these current and/or voltage measurements may be provided to the power tool 102 or other connected power tool device for calibration or for other use.

In some embodiments, the power tool pack adapter 106 may also include a wireless communication device 260. In these embodiments, the wireless communication device 260 is coupled to the electronic controller 220 (e.g., via the device communication bus 276). The wireless communication device 260 may include, for example, a radio transceiver and antenna, a memory, and an electronic processor. In some examples, the wireless communication device 260 can further include a global navigation satellite system ("GNSS") receiver configured to receive signals from GNSS satellites (e.g., global positioning system ("GPS") satellites), land-based transmitters, etc. The radio transceiver and antenna operate together to send and receive wireless messages to and from the external device 110, one or more additional power tool devices, the server 112, and/or the electronic processor of the wireless communication device 260. The memory of the wireless communication device 260 stores instructions to be implemented by the electronic processor and/or may store data related to communications between the power tool pack adapter 106 and the external device 110, one or more additional power tool devices, and/or the server 112.

The electronic processor for the wireless communication device 260 controls wireless communications between the power tool pack adapter 106 and the external device 110, one or more additional power tool devices, and/or the server 112. For example, the electronic processor of the wireless communication device 260 buffers incoming and/or outgoing data, communicates with the electronic processor 230 and determines the communication protocol and/or settings to use in wireless communications.

In some embodiments, the wireless communication device 260 is a Bluetooth® controller. The Bluetooth® controller communicates with the external device 110, one or more additional power tool devices, and/or the server 112 employing the Bluetooth® protocol. In such embodiments, therefore, the external device 110, one or more additional power tool devices, and/or the server 112 and the power tool pack adapter 106 are within a communication range (i.e., in proximity) of each other while they exchange data. In other embodiments, the wireless communication device 260 communicates using other protocols (e.g., Wi-Fi, cellular protocols, a proprietary protocol, etc.) over a different type of wireless network. For example, the wireless communication device 260 may be configured to communicate via Wi-Fi through a wide area network such as the Internet or a local area network, or to communicate through a piconet (e.g., using infrared or NFC communications). The communication via the wireless communication device 260 may be encrypted to protect the data exchanged between the power tool pack adapter 106 and the external device 110, one or more additional power tool devices, and/or the server 112 from third parties.

The wireless communication device 260, in some embodiments, exports usage data, other power tool device data, and/or other data as described above from the power tool pack adapter 106 (e.g., from the electronic processor 230).

The wireless communication device 260 also enables the power tool pack adapter 106 to sync or otherwise communicate data with other devices, such as an external device 110 that is configured as a smart watch or other wearable device. In some instances, the power tool pack adapter 106 can send and receive health information for the user (e.g., by syncing with a heartrate monitor, smart watch, or other wearable device).

The wireless communication device 260 can also enable the power tool pack adapter 106 to transmit identifying information (e.g., a beaconing message) that helps for location tracking of the power tool pack adapter 106 and/or any power tool devices connected to the power tool pack adapter 106.

In some embodiments where a wireless communication device is also present on a connected power tool device (e.g., a power tool and/or battery pack), the power tool pack adapter 106 and connected power tool devices can coordinate when, what, and/or how to communicate. For example, a connected power tool may elect when connected to use the wireless communication device 260 of the power tool pack adapter 106, which may have an improved range, better reliability, and/or avoid data charges. In some embodiments the power tool pack adapter 106 may lack a wireless communication device 260, but may instead rely on a wireless communication device of a connected power tool device.

In some embodiments the wireless communication device(s) on the power tool pack adapter 106 and any connected power tool device(s) may coordinate to send data in parallel (e.g., for faster upload speeds).

In some embodiments, the power tool pack adapter also optionally includes additional electronic components 270. The electronic components 270 can include, for example, one or more of an audio element (e.g., a speaker, one or more microphones).

The electronic components 270 may also include an RFID tag to store a power tool device identification number, an RFID reader to read the power tool device identification number stored on an RFID tag of another power tool device, an NFC tag to store a power tool device identification number, and/or an NFC reader to read the power tool device identification number stored on an NFC tag of another power tool device. An RFID reader and/or NFC reader can also enable the power tool pack adapter 106 to sync settings with other power tool devices or accessories and/or to receive information from other power tool devices, accessories, fasteners, etc.

In some embodiments, the electronic components 270 can include a scanner that is configured for scanning of bar codes, QR codes, or other codes (e.g., other data matrix codes). By scanning a QR code, barcode, or other code, the scanner can receive information (e.g., settings or other information).

In some embodiments, the electronic components 270 can include a fingerprint scanner. For example, the fingerprint scanner can be coupled to the housing 160 of the power tool pack adapter 106 such that a user can have their fingerprint scanned by the fingerprint scanner to provide certain functionality. As an example, the fingerprint scanner can provide additional safety and/or security locking of the power tool pack adapter 106 (e.g., by engaging and disengaging the locking mechanism 166 of the power tool pack adapter 106) or the connected power tool device (e.g., by locking or otherwise rendering the attached power tool devices inoperable until unlocked by an authorized user's fingerprint). This can provide additional safety (e.g., by preventing an untrained user from operating a power tool) or security (e.g., by preventing theft of a connected power tool device, since the stolen power tool device would be inoperable until unlocked by an authorized user).

The electronic components 270 may further include one or more switches (e.g., for initiating and ceasing operation of the power tool device), one or more sensors, one or more motors, etc. For example, in a motorized power tool (e.g., drill-driver, saw, etc.), electronic components 270 can include, for example, an inverter bridge, a motor (e.g., brushed or brushless) for driving a tool implement, etc. For a non-motorized power tool (e.g., a work light, a work radio, ruggedized tracking device, etc.), the electronic components 270 can include, for example, one or more of a lighting element (e.g., LEDs for illuminating a work area), an audio element (e.g., a speaker), a power source, etc. In some embodiments, electronic controller 220 can be configured to control one or more of electronic components 270. For example, in instances where the power tool device 102 is a motorized power tool and the electronic components 270 include a motor and a sensor for sensing actuation of a trigger of a power tool, the electronic controller 220 can be configured to control an inverter bridge or otherwise control driving of the motor based on sensed actuation of the trigger.

In some embodiments, the electronic controller 220 is also connected to one or more sensors 272, which may include voltage sensors or voltage sensing circuits, current sensors or current sensing circuits, temperature sensors or temperature sensing circuits, inertial sensors or inertial sensing circuits (e.g., accelerometers, gyroscopes, magnetometers), a pressure sensor or pressure sensing circuit (e.g., a barometer), or the like. The temperature sensor(s) may include, for example, a thermistor. The power tool pack adapter 106 may also include connections (e.g., wired or wireless connections) for external sensors. In some embodiments, the sensor(s) 272 can record vibration data of the power tool pack adapter 106 and/or connected power tool device(s) and the electronic processor 230 in response thereto can generate an indication that excessive vibration levels (e.g., levels that may be set by an occupational safety organization or that such an organization has indicated are associated with hand-arm vibration syndrome ("HAVS")) may be likely with prolonged use of the connected power tool device(s). The HAVS detection can be communicated to the user via an external device 110 as a message (e.g., text message), app notification, or other alert.

As one example, the sensor(s) 272 can include inertial sensors that record data that when processed by the electronic processor 230 allow for detecting whether the power tool pack adapter 106 or a connected power tool device was dropped. For instance, the sensor(s) 272 in the power tool pack adapter 106 can record data that when processed by the electronic processor 230 can indicate whether a fall, blow, or other impact has occurred to the power tool pack adapter 106 and/or connected power tool device(s). In response to the detected force, the electronic processor 230 can control the connected power tool device(s) to automatically shut them off as a safety feature.

As another example, the sensor(s) 272 can also provide positional information for the power tool pack adapter 106 or connected power tool device(s). For instance, the sensor(s) 272 can record data than enable leveling of the power tool pack adapter 106 or connected power tool device(s).

The sensor(s) 272 and other electronic components of the power tool pack adapter 106 can transmit their data to external sources, such as an external device 110 and/or server 112 (e.g., via the network 108 or directly). In some embodiments, the transmitted data can be integrated with software or other tools, such as surveying tools like Total Stations/Layout Solutions.

The sensor(s) 272 may also be used for the detection of bind-up in a connected power tool, help application classification of a connected power tool device, or other power tool or power tool device features.

The sensor data collected by the sensor(s) 272 in general may be transmitted to a second power tool device (e.g., a power tool). The sensor data may be preprocessed, encoded, or analyzed before being transmitted. For example, the electronic processor 230 can preprocess, encode, and/or analyze the sensor data and the wireless communication device 260 may retrieve and transmit the sensor data. Additionally or alternatively, a separate power tool device that may not be connected to the power tool pack adapter 106 may send data to the power tool pack adapter 106 and the power tool pack adapter 106 may receive the data (e.g., via the wireless communication device 260) and process the data (e.g., by performing computations, or the like, using the electronic processor 230). This processing and/or computation may be performed while a power tool device (whether connected to the power tool pack adapter 106 or not) is in active operation, after operations, or at any time.

In some embodiments, the power tool pack adapter 106 may include a machine learning controller 210. In these instances, the machine learning controller 210 is coupled to the electronic controller 220 (e.g., via the device communication bus), and in some embodiments may be selectively coupled such that an activation switch (e.g., mechanical switch, electronic switch, UI element input(s) 290 of the power tool pack adapter 106) can selectively switch between an activated state and a deactivated state. When the activation switch is in the activated state, the electronic controller 220 is in communication with the machine learning controller 210 and receives decision outputs from the machine learning controller 210. When the activation switch is in the deactivated state, the electronic controller 220 is not in communication with the machine learning controller 210. In other words, the activation switch selectively enables and disables the machine learning controller 210.

The machine learning controller 210 implements a machine learning program, algorithm or model. In some implementations, the machine learning controller 210 is configured to construct a model (e.g., building one or more algorithms) based on example inputs, which may be done using supervised learning, unsupervised learning, reinforcement learning, ensemble learning, active learning, transfer learning, or other suitable learning techniques for machine learning programs, algorithms, or models. Additionally or alternatively, the machine learning controller 210 is configured to modify a machine learning program, algorithm, or model; to active and/or deactivate a machine learning program, algorithm, or model; to switch between different machine learning programs, algorithms, or models; and/or to change output thresholds for a machine learning program, algorithms, or model.

The machine learning controller 210 can include a trained machine learning controller that utilizes previously collected data to analyze and classify new data from the power tool pack adapter 106 and/or connected power tool device(s). The machine learning controller 210 can identify conditions, applications, and states of the power tool pack adapter 106 and/or connected power tool device(s).

The machine learning controller 210 may be a static machine learning controller, a self-updating machine learning controller, an adjustable machine learning controller, or the like. In some embodiments, the power tool pack adapter 106 may include more than one machine learning controller 210 machine learning controller 210 may be of a different type. For example, a power tool pack adapter 106 may include a static machine learning controller and may also include a self-updating machine learning controller. In another example, the power tool pack adapter 106 may include a static machine learning controller. The static machine learning controller may be subsequently removed and replaced by, for example, an adjustable machine learning controller. In some examples, the power tool pack adapter 106 may run self-updating logic (e.g., reinforcement learning techniques) on a machine learning model. The new machine learning model or its updates (e.g., the gradient) may then be transmitted to the power tool 102, other connected power tool device, or server 112 for distributed learning. The power tool pack adapter 106 may also implement A/B testing of models or firmware, provide the ability for users to give feedback to models (e.g., with screen prompts or button press feedback, such as via one or more input(s) 290), develop and deploy genetic algorithms, etc.

In some embodiments, the power tool pack adapter 106 may implement an artificial intelligence controller instead of, or in addition to, the machine learning controller 210. The artificial intelligence controller implements one or more AI programs, algorithms, or models. In some embodiments, the AI controller is configured to implement the one or more AI programs, algorithms, or models such as an expert system, a rules engine, a symbolic logic, one or more knowledge graphs, and so on. In some embodiments, the AI controller is integrated into and implemented by the electronic controller 220 (e.g., the electronic controller 220 may be referred to as an AI controller). In some embodiments, the AI controller is a separate controller from the electronic controller 220 and includes an electronic processor and memory, similar to the machine learning controller 210.

In some embodiments, the power tool battery device 102 can include one or more inputs 290 (e.g., one or more buttons, switches, and the like) that are coupled to the electronic controller 220 and allow a user to select a mode of the power tool pack adapter 106 or connected power tool device(s). In some embodiments, the input 290 includes a user interface ("UI") element, such as an actuator, a button, a switch, a dial, a spinner wheel, a touch screen, or the like, that enable user interaction with the power tool pack adapter 106.

A switch or dial could change between a wake word versus a button press or trigger wake up (e.g., enable or disable a wake word). As an example, a trigger wake up includes briefly pulsing the trigger (or otherwise varying the depression of the trigger in a particular, controlled manner) to activate listening (e.g., by detecting audio via one or more microphones), image taking (e.g., by capturing an image with a camera of the power tool pack adapter 106), or the like. For instance, one embodiment can include pulling the trigger when the forwards/reverse switch is in a neutral position. Additionally or alternatively, user input and/or feedback can be provided by changing the state of the forwards/reverse switch on a connected power tool. For example, rapidly changing between forwards and reverse (e.g., forward, reverse, forwards, reverse, . . . ) can indicate a user input and/or feedback. As still another example, user input and/or feedback can be provided by actuating a mode selection button on a power tool device (e.g., by pressing and holding a mode select button for a particular duration of time).

For some power tool devices, using a wake word before recording audio can be advantageous (e.g., on a work light that may be out of reach of the user). For other power tool devices, a wake word may not be necessary (e.g., a power tool that is already close by or in the user's hand). In any event, actuating the UI element can control switching between modes (e.g., when a wake word is needed or not needed for recording audio) to control operation of the connected power tool device(s) via voice commands.

In some embodiments, the UI element can switch the power tool pack adapter 106 and/or connected between different modes (e.g., different operational modes). In some other embodiments, the UI element can switch the power tool pack adapter 106 and/or connected between different parameters (e.g., different torque values for a torque wrench). Advantageously, actuating a UI element on the power tool pack adapter 106 can be more convenient that adjusting similar settings via an external device 110 (e.g., a smartphone). Furthermore, having the UI element on the power tool pack adapter 106 enables the mode and/or parameter switching functionality for power tool devices that otherwise do not have this functionality when manufactured, or are otherwise not IoT-compatible As noted above, the power tool pack adapter 106 can include one or more microphones as the input(s) 290. The microphone(s) can be used to detect and record audio (e.g., voice commands from a user) which can be processed by the electronic processor 230 to generate control actions for the power tool 102, the battery pack 104, or both. In some embodiments, the power tool pack adapter 106 can include two or more microphones to enable noise cancellation to be implemented by the electronic processor 230.

Advantageously, the microphone(s) can record audio from the environment, including voice commands from a user. The voice data recorded by the microphone(s) can be processed by the electronic processor 230 of the power tool pack adapter 106 to determine control operations for the power tool pack adapter 106 and/or connected power tool device(s). For example, the electronic processor 230 can implement a program, algorithm, or model (e.g., a machine learning or other artificial intelligence algorithm, program, or model) that enables natural language processing, or other conversion of the recorded voice data into control settings or data for controlling the function or operation of the power tool pack adapter 106 and/or connected power tool device(s).

Examples of potential voice commands for a connected power tool device are illustrated in Table 1 below.

| Tool | Potential Phrases |
|---|---|
| Most Power Tools | Lock my tool. |
| | Assign my tool to [user name]. |
| | Reset to factory defaults. |
| | When is my tool due for service? |
| | What is the serial number? |
| | Why did you shut off? |
| | Whose tool is this? |
| | Keep my work light on. |
| | Make the password [password]. |
| | Rename yourself [tool name]. |
| | Where are you [tool name]? |
| | Order me more [type of fasteners]. |
| | Remind me to call [contact]. |
| | Call [contact]. |
| Lights | Turn on. |
| | Turn off. |
| | Stay on until [time of day]. |
| | Brighter. |
| | Dimmer. |
| | Auto brightness. |
| | Turn on at [time of day]. |
| | Turn on with motion. |
| | Activate emergency mode. |

-continued

| Tool | Potential Phrases |
|---|---|
| Impact | Torque to 120 ft-lbs.<br>Set up for a [particular vehicle or work object].<br>Inspect these bolts.<br>Break these bolts off.<br>Work with this torque stick.<br>Report these bolts to the inspector. |
| Drill/Driver | Set the mode for drywall.<br>Activate mode for [particular fastener type].<br>Set the clutch for deck screw.<br>Set tool for 5" hole saw.<br>Target 5 ft-lbs.<br>Go into pulse mode.<br>Keep work light on |
| Reciprocating saw | Set for plunge cuts.<br>Activate cut brake.<br>Turn on blade efficiency. |
| Packout | Lock out.<br>Are any of my tools missing?<br>Who I am? |
| Chainsaw | Optimize for hardwoods.<br>Have maximum bind-up sensitivity. |
| Chargers | Make my working hours [time of day to other time of day].<br>Do a maintenance check.<br>Charge these faster.<br>Tell the GC to replace these batteries. |
| Wet/Dry Vacuum | Pair with my hammer drill.<br>Let me know when 60% full. |
| Fan | More air! |
| Crimper | Begin the cutting process [while not touching the tool] |

Additionally or alternatively, the microphone(s) can record audio from the environment and the electronic processor 230, in response thereto, can generate an alert when the volume of the ambient sounds in the environment are too loud (e.g., indicating unsafe conditions without proper PPE). The electronic processor 230 can in some embodiment generate the alert and communicate the alert (e.g., via wireless communication device 260) to the external device 110 (e.g., via a text message, app notification, or the like). The alert can in some instances include a notification to the user to have proper PPE to protect their hearing in the In some embodiments, the microphone(s) can record audio from the environment and the electronic processor 230, in response thereto, can determine what materials are being worked on by the power tool device(s) connected to the power tool pack adapter 106. The electronic processor 230 can process the audio recordings and present the user with a notification (e.g., via the external device 110) identifying the material being worked on, and can in some instances present one or more options for operation settings of the power tool device(s) that are optimized or otherwise advantageous for working with the determined material. In some embodiments, the electronic processor 230 can automatically adjust the operational settings of the power tool device(s) in response to the determined material.

In still other embodiments, the microphone(s) can record audio from the environment and the electronic processor 230, in response thereto, can determine the functional characteristics of a power tool device. As one example, the audio data can be processed to determine whether a vacuum is full or not. As another example, the audio data can be processed to identify if there are any issues with the connected power tool device(s) that can be determined based on audio detection. For instance, grinding sounds, broken bearings, stack rub, dull blades, and the like can be detected by processing the audio data with the electronic processor 230. In response to the detected issue, the electronic processor 230 can generate a notification or alert that is then presented to the user (e.g., via the external device 110). In some instances, the notification may indicate preventative maintenance that would resolve the issue before it gets worse. Additionally or alternatively, the electronic processor 230 may automatically shut off the faulty power tool device to prevent further damage from occurring.

The microphone(s) may record audio from the environment and detect the presence of other things on a jobsite, such as the presence of people, shouts for help, use of power tool devices, use of hand tools, vehicles reversing (e.g., by listening for a back-up beeper), presence of music, sounding of alarms, sound of leaks/drops/explosions/break-ins/fires, general activity level, etc.

The microphone data may be processed in whole or in part on the power tool pack adapter 106, on a connected power tool device, and/or transmitted wirelessly to a secondary processing device (external device 110, server 112, hub, etc.).

As noted above, the microphone(s) may employ noise cancelling via the use of multiple microphones for either directional input or improved recognition. Sound data may be spatially tracked based on the orientation of the tool and the perceived location of emission.

In some embodiments, the input(s) 290 can include an optical receiver that is configured to receive or otherwise detect optical signal data (e.g., light signals, characters, images). In general, an optical receiver can include a photodetector, such as a light sensor or a camera, that is configured to receive or otherwise detect optical signal data, record images, or perform other optical reception and/or detection functions. In some embodiments, the power tool pack adapter 106 is capable of wirelessly communicating with an optical transmission source (e.g., a light or other optical transmitter) using free-space optical communication.

The input(s) 290 can include one or more cameras. The camera(s) can include a camera having a wide-angle lens (e.g., a fisheye lens). The camera(s) can be configured and/or arranged on the power tool pack adapter 106 such that a 360-degree view around the power tool pack adapter 106 is provided. In some embodiments, the camera(s) may be an infrared ("IR") camera.

As an example, a camera can be used to detect codes, such as QR codes, barcodes, or the like. The camera can record an image of the code and the electronic processor 230 can receive and process the image to decode the code and generate a control action in response thereto.

As another example, a camera can be used to record or otherwise capture images of the environment. The images can be photographs or videos of the jobsite, as an example. In some embodiments, images can be recorded and shared by the pack adapter 106 to an external device 110, server 112, or the like. As one example, images can be shared with an external device 110 or server 112 running building information modeling ("BIM") software. As another example, images can be shared to social media (e.g., by communicating the images to a social media site via the network 108). Images can also be shared with other users, groups, individuals, or organizations. For example, images can be shared with local building inspectors, general contractors, or the like. In some embodiments, a connected power tool device may require an image or video as part of performing an application.

In some embodiments, the power tool pack adapter 106 can record images indicating the completion of a work project, and the images can be shared (e.g., via the external device 110, server 112, or the like) and associated with the work completed. In some instances, a measure of work completed can be associated with sensor data recorded by the sensor(s) 272.

Images of the environment can also be recorded and processed by the electronic processor 230 to generate power tool device data. As one example, images of a work object can be captured and stored to associate power tool device data with a particular work task. For instance, an image of a license plate can be recorded and associated with work done on a particular vehicle.

As another example, the electronic processor 230 can implement a program, algorithm, or model (e.g., a machine learning or other artificial intelligence algorithm, program, or model) that performs optical character recognition to convert textual information in a recorded image into metadata or other power tool device data that can be stored in the memory 240 of the power tool pack adapter 106, or otherwise communicated to an external device and/or server 112 for storage or processing.

In some embodiments, images of the environment, in addition to other positional data (e.g., GNSS data) can be processed by the electronic processor 230 to provide SLAM for multi-application uses. For example, when a work task involves working on lugs on a wheel, the camera of the power tool pack adapter 106 can be used to track from one step (0) to another.

In some embodiments, the images or video may be processed in whole or in part on a connected power tool device and/or processed in whole or in part on a wirelessly connected secondary device (e.g., a different power tool device, an external device 110, a server 112, a hub, etc.).

In some embodiments, the images or video may be processed to perform automatic people blurring, safe content filtering, sharpness/quality/unobstructed view assurance, etc. A power tool device may alert a user based on this process (e.g., by warning a user if a camera lens appears dirty). For example, the power tool pack adapter 106 can generate an alert to a user via output(s) 292, such by generating an audio alert, a visual alert (e.g., a blinking LED, display on a screen), sending a message (e.g., to an external device 110), or the like. Similarly, the power tool pack adapter 106 can control a connected power tool device 102 to send an alert using an output of the connected power tool device.

In some embodiments, the images or video may appear on a UI display (e.g., an output 292 of the power tool pack adapter 106, an external device 110) for a user to see or inspect.

In some embodiments, the input(s) 290 can include one or more data input slots, readers, or other such inputs. For example, the input(s) 290 can include different data cards or card readers for different capabilities (e.g., memory cards, Bluetooth® communication cards). Additionally or alternatively, the one or more data input slots can receive other inputs or insertable components, such as extra processing units and/or wireless communication devices or modules. In some embodiments, the microphone(s), camera(s), and/or additional UI elements may reside on such an insertable component into the power tool pack adapter 106. By allowing for this modularity, secondary electronic devices can be provided with the power tool pack adapter 106 for more functionality.

In some embodiments, the power tool pack adapter 106 may include one or more outputs 292 that are also coupled to the electronic controller 220. The output(s) 292 can receive control signals from the electronic controller 220 to present data or information to a user in response, or to generate other visual, audio, or other outputs. As one example, the output(s) 292 can generate a visual signal to convey information regarding the operation or state of the power tool pack adapter 106 or connected power tool device(s) to the user. The output(s) 292 may include, for example, LEDs (e.g., LEDs 192) or a display screen (e.g., display screen 192) and may generate various signals indicative of, for example, an operational state or mode of the power tool pack adapter 106 or connected power tool device(s), an abnormal condition or event detected during the operation of the power tool pack adapter 106 or connected power tool device(s), and the like. For example, the output(s) 292 may indicate the state or status of the power tool pack adapter 106 or connected power tool device(s), an operating mode of the power tool pack adapter 106 or connected power tool device(s), and the like.

The output(s) 292 can be one or more light emitting diodes ("LEDs") or other lights or visual indicators. For example, the output(s) 292 can include a work light, a status light, a mode light, a laser light, or other light. In some embodiments, the LEDs 190 or other light(s) can be configured to provide optical data transmission as a primary function, or as a secondary function. The lights may also be a very bright light on the power tool pack adapter 106 that is useful as a flashlight and/or additional work light. In some embodiments, the output(s) can include one or more lights (e.g., LEDs 190) that are configured to generate light in a nonvisible spectrum, such as infrared ("IR") light. As another example, the light can be a laser light that enables laser positioning and/or leveling of the power tool pack adapter 106 and/or connected power tool device(s).

As another example, a light (e.g., LEDs 190) may be configured to display to a user a characteristic success or failure of an application (e.g., green vs. yellow vs. red). The light may be configured to correspond to a mode or configuration of a connected power tool device. The light may also be configured to help visually identify a power tool device (e.g., to help with pairing, identifying a power tool device in a crib, etc.). The light may also provide other warnings (e.g., lower battery, approaching a thermal overload, etc.)

In some embodiments, the output(s) 292 can include a flat panel display 192, such as a liquid crystal display ("LCD") panel, an LED display panel, an electrophoretic display panel, and the like. The flat panel display 192 can be configured to generate characters (e.g., a character display) or images. As an example, the flat panel display 192 can be configured to generate images including bar codes, matrix bar codes (e.g., quick response ("QR") codes), or other images that provide an encoded representation of data. As another example, the flat panel display 192 can be configured to generate characters (e.g., single characters, character strings) that provide an encoded representation of data.

A flat panel display 192 can present information to a user. For example, a flat panel display 192 can provide a battery state-of-charge readout that provides more details, error codes, state-of-health, coulomb counting, etc.; and/or a charger status readout (e.g., placing a power tool pack adapter 106 on a power tool battery charger can indicate if batteries are on power tool battery charger or other power tool battery chargers in a connected network of power tool devices).

In some embodiments, a flat panel display 192 can display mode settings to a user. In still other embodiments, a flat panel display 192 can provide a camera view (e.g., for facial recognition; confirming safety glass, hard hat, and/or other PPE compliance of a user; QR code scanning; barcode scanning, etc.).

A flat panel display 192 on the power tool pack adapter 106 can also be configured to display information associated with a power tool use application. For example, the flat panel display 192 can display information about material being worked on with the power tool 102 (e.g., material being cut, material being drilled, fastener being tightened, work object being worked on). The flat panel display 192 can also display text, such as text generated by voice commands to the power tool pack adapter 106 and converted to text using speech-to-text.

In some embodiments, the output(s) 292 can include one or more speakers. The speakers can be used to play music (e.g., radio, music streaming from a connected external device 110). As another example, the speakers can be used in conjunction with one or more microphones to provide communication between two or more power tool pack adapters 106. For example, two users can communicate using the power tool pack adapters 106 in a walkie-talkie system. Additionally or alternatively, a power tool pack adapter 106 can be used to communicate with a user's external device 110 (e.g., similar to a phone).

In some embodiments, the output(s) 292 can include haptic feedback to a user of the power tool pack adapter 106.

The output(s) 292 can also include other analog and/or digital outputs, such as a tether to an output screen, an HDMI output, or a USB output.

The electronic processor 230 can control operation of the power tool pack adapter 106 to operate in a data transmission mode and a pass-through mode, among other modes. In the data transmission mode, the power tool pack adapter 106 communicates with the power tool 102, the battery pack 104, or other connected power tool device(s) using the techniques described above. During the data transmission mode, the power tool pack adapter 106 can receive and transmit information related to, for example, power tool device data and other data including power tool usage data, usage statistics, power tool identification, power tool maintenance data, battery pack discharge cycles, battery pack charge cycles, battery pack conditions and characteristics, configuration and programming data, firmware updates, or a command (e.g., sound an alert tone or flash an LED).

The pass-through mode refers to the operation of the power tool pack adapter 106 during which data communication does not occur and during which electrical power from the battery pack 104 is passed through the power tool pack adapter 106 to reach the power tool 102 or other connected power tool device. Instead of exchanging information between the power tool 102 or the battery pack 104, the power tool pack adapter 106 serves as an intermediary pathway between the device interface of the power tool 102 and the power interface of the battery pack 104. During the pass-through mode, the battery pack 104 transmits electrical power to the power tool 102, which enables the power tool 102 to perform the associated task (e.g., drilling, driving, sawing, sanding, etc.). In the pass-through mode, the some or all of the additional functionality of the power tool pack adapter 106 may also still be utilized.

The power tool pack adapter 106 can switch between the data transmission mode and the pass-through mode based on the state of the power tool 102, via actuation of a UI element input 290 on the power tool pack adapter 106, or the like. For example, when the power tool 102 is in the active state, the power tool pack adapter 106 can operate in the pass-through mode such that the power tool 102 receives electrical power from the battery pack 104 and communication between the power tool 102 and the battery pack 104 is enabled. On the other hand, when the power tool 102 is in an idle state, the power tool pack adapter 106 is able to exchange data with the power tool 102 or with the battery pack 104, if connected. Accordingly, in some embodiments, the power tool pack adapter 106 operates in the data transmission mode when the power tool 102 is in the idle state and operates in the pass-through mode when the power tool 102 is in the active state.

Figure 14:
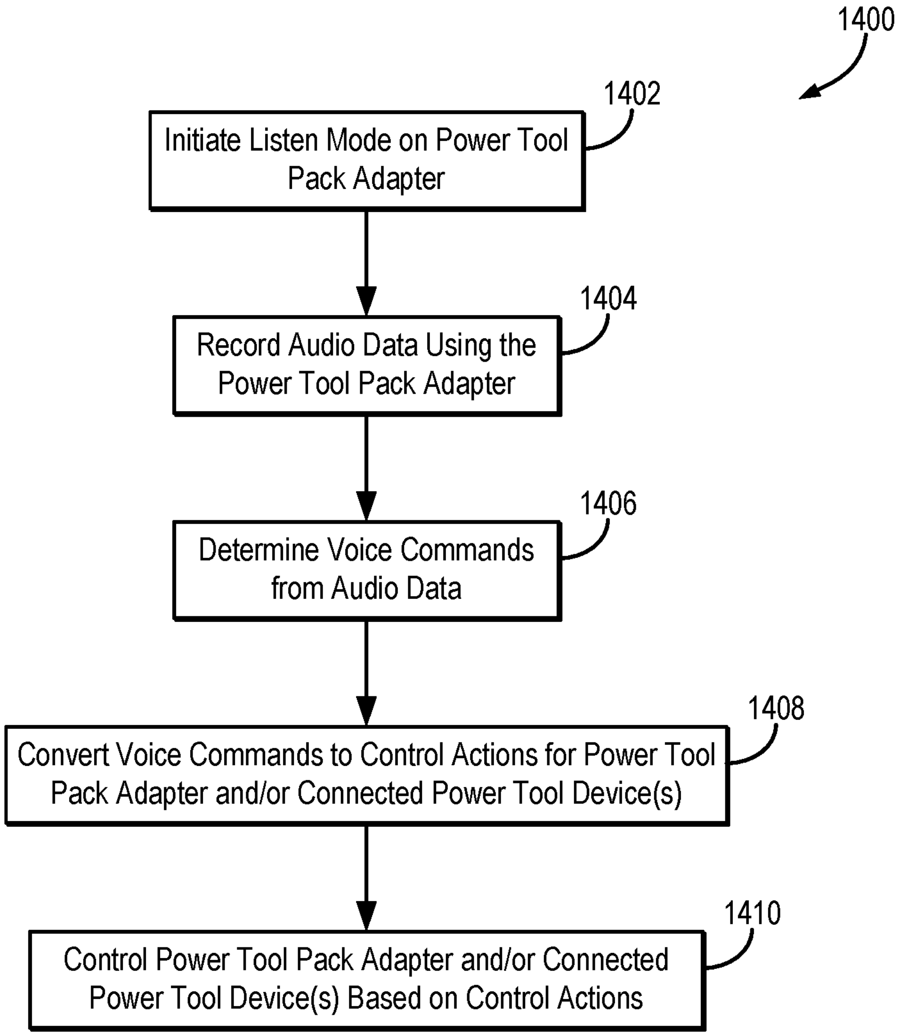
FIG. 14 is a flowchart of an example method for controlling the operation of a power tool pack adapter and/or connected power tool device(s) based on voice commands detected and processed by a power tool pack adapter.

FIG. 14 illustrates a process 1400 of controlling a power tool device (e.g., a power tool, a battery pack, a power tool battery charger, etc.) connected to a power tool pack adapter 106 using voice commands.

At process block 1402, a listen mode of the power tool pack adapter 106 is initiated. As one example, the listen mode can be initiated by actuating a UI element on the power tool pack adapter 106 (e.g., pushing a button, toggling a switch, turning a dial, or otherwise actuating a UI element input 290). Additionally or alternatively, the power tool pack adapter 106 can enter a listen mode by actuating a UI or other element on a connected power tool device. For example, a trigger pull on a connected power tool 102 can cause the electronic processor 230 of the power tool adapter 106 to switch the power tool pack adapter 106 into a listen mode. Additionally or alternatively, the power tool pack adapter 106 can enter a listen mode when a wake word is detected by an input 290 (e.g., one or more microphones) of the power tool pack adapter 106.

In the listen mode, the input(s) 290 (e.g., one or more microphones) of the power tool pack adapter 106 begin recording audio, as indicated at process block 1404. When audio is detected, the recorded audio data are processed by the electronic processor 230 at process block 1406 to determine one or more voice commands present in the audio data. For example, the electronic processor 230 can implement a program, algorithm, or model (e.g., a machine learning control, an artificial intelligence control) to perform natural language processing, or the like, the determine the presence of voice commands in the audio data. Furthermore, the electronic processor 230 can decipher or otherwise decode the voice commands and translate the voice commands into control actions for the power tool pack adapter 106 and/or the connected power tool device(s), as indicated at process block 1408. In some embodiments, blocks 1406 and/or 1408 are performed in whole or in part by another device that is in communication with the power tool adapter 106, such as the server 112 and/or the external device 110. For example, the power tool adapter 106 may transmit the recorded audio data to the other device, and this device may process the recorded audio data to determine the one or more voice commands present in the audio data. The other device may then transmit the determined voice commands to the power tool adapter 106, which may then continue on with block 1408. Additionally or alternatively, the other device may convert the determined voice commands into the control actions and transmit those determined control actions back to the power tool adapter 106. In this example, the power tool adapter 106 may then continue on with block 1410. In block 1410, the electronic processor 230 can then process the control actions to cause the electronic controller 220 of the power tool pack adapter 106 to control the operation of the power tool pack adapter 106 and/or connected power tool device(s). For example, the power tool pack adapter 106 may control one or more electronic components 270 in accordance with the control actions, may transmit commands to a connected power tool device (e.g., a power tool) via the third interface 124, and/or may transmit commands to another connected power tool device (e.g., a power tool battery pack) via the fourth interface 126.

Examples of voice commands and corresponding control actions are described above (e.g., with respect to Table 1). Additionally or alternatively, the commands may be transmitted from the power tool pack adapter 106 to other power tool devices (e.g., other power tool devices in a connected power tool device network) via the wireless communication device 260. For instance, the power tool pack adapter 106 may be used by a user to control the operation of other power tool devices connected in a mesh network or other power tool device network, such as controlling the volume on a radio, adjusting the operation of a vacuum, or the like.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk ("CD"), digital versatile disk ("DVD"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover the items individually and both items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The provided detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. An adapter for a power tool, comprising:
- a housing;
- a first interface supported by the housing and configured to couple to a first power tool device;
- a second interface supported by the housing and configured to couple to a second power tool device, the second interface being in electrical communication with the first interface;
- at least one microphone coupled to the housing; and
- an electronic controller supported by the housing and coupled to the first interface, the second interface, and the at least one microphone, the electronic controller configured to:
  - identify a wake word in audio data passively recorded by the at least one microphone;
  - in response to identifying the wake word, receive audio data actively recorded by the at least one microphone;
  - determine a voice command in the audio data by:
    - processing the audio data to determine the voice command in the audio data; or
    - transmitting the audio data to a machine learning controller of the adapter to process the audio data and receiving, in response, the voice command from the machine learning controller;
  - convert the voice command to a control action; and
  - control operation of at least one of the electronic controller, the first power tool device, or the second power tool device based on the control action.

2. The adapter of claim 1, wherein the electronic controller is configured to process the audio data using a natural language processing algorithm to determine a voice command in the audio data.

3. The adapter of claim 1, wherein the adapter comprises the machine learning controller, and wherein the machine learning controller receives the audio data from the electronic controller, processes the audio data via a natural language processing algorithm, and generates an output as the determined voice command.

4. The adapter of claim 1, further comprising a wireless communication device coupled to the housing and in communication with the electronic controller, wherein the electronic controller transmits the control action via the wireless communication device to a wirelessly connected power tool device in order to control operation of the wirelessly connected power tool device based on the control action.

5. The adapter of claim 1, wherein the electronic controller is further configured to operate in a listen mode in which the electronic controller silences or turns off at least one of the first power tool device or the second power tool device.

6. The adapter of claim 1, wherein the adapter comprises the machine learning controller, and wherein the machine learning controller is coupled to the electronic controller via an activation switch, the activation switch configured to selectively switch between an activated state and a deactivated state.

7. A system comprising:
- a first power tool device;
- a second power tool device; and
- an adapter for a power tool, comprising:
  - a housing;
  - a first interface supported by the housing and configured to couple to the first power tool device;
  - a second interface supported by the housing and configured to couple to the second power tool device, the second interface being in electrical communication with the first interface;
  - at least one microphone coupled to the housing; and
  - an electronic controller supported by the housing and coupled to the first interface, the second interface, and the at least one microphone, the electronic controller configured to:

identify a wake word in audio data passively recorded by the at least one microphone;

in response to identifying the wake word, receive audio data actively recorded by the at least one microphone;

determine a voice command in the audio data by:

processing the audio data to determine the voice command in the audio data, or transmitting the audio data to a machine learning controller of the adapter to process the audio data and receiving, in response, the voice command from the machine learning controller;

convert the voice command to a control action; and control operation of at least one of the electronic controller, the first power tool device, or the second power tool device based on the control action.

8. The system of claim 7, wherein the electronic controller is configured to process the audio data using a natural language processing algorithm to determine a voice command in the audio data.

9. The system of claim 7, wherein the adapter comprises the machine learning controller, and wherein the machine learning controller receives the audio data from the electronic controller, processes the audio data via a natural language processing algorithm, and generates an output as the determined voice command.

10. The system of claim 7, further comprising a wireless communication device coupled to the housing and in communication with the electronic controller, wherein the electronic controller transmits the control action via the wireless communication device to a wirelessly connected power tool device in order to control operation of the wirelessly connected power tool device based on the control action.

11. The system of claim 7, wherein the first power tool device is a power tool and the second power tool device is a battery pack.

12. The system of claim 7, wherein the first power tool device is a battery pack and the second power tool device is a power tool battery charger.

13. The system of claim 7, wherein the first power tool device is a battery pack and the second power tool device is a power supply.

14. The system of claim 7, wherein the electronic controller is further configured to operate in a listen mode in which the electronic controller silences or turns off at least one of the first power tool device or the second power tool device.

15. The system of claim 7, wherein the adapter comprises the machine learning controller, and wherein the machine learning controller is coupled to the electronic controller via an activation switch, the activation switch configured to selectively switch between an activated state and a deactivated state.

16. A method of operating an adapter for a power tool, the method comprising:

receiving, by a first interface of the adapter, a first power tool device;

receiving, by a second interface of the adapter, a second power tool device, the second interface being in electrical communication with the first interface;

passively recording audio data with at least one microphone coupled to a housing of the adapter;

identifying, by an electronic controller of the adapter, a wake word in the passively recorded audio data;

in response to identifying the wake word, actively recording audio data with the at least one microphone;

determining, by the electronic controller, a voice command in the audio data by:

processing, by the electronic controller, the audio data to determine the voice command in the audio data, or transmitting the audio data to a machine learning controller of the adapter to process the audio data and receiving, in response, the voice command from the machine learning controller;

converting, by the electronic controller, the voice command to a control action; and controlling operation of at least one of the electronic controller of the adapter, the first power tool device, or the second power tool device based on the control action.

17. The method of claim 16, wherein determining, by the electronic controller, the voice command in the actively recorded audio data is performed by the electronic controller processing the actively recorded audio data using a natural language processing algorithm to determine the voice command.

18. The method of claim 16, further comprising:

transmitting the control action, by the electronic controller via a wireless communication device of the adapter, to a wirelessly connected power tool device in order to control operation of the wirelessly connected power tool device based on the control action.

19. The method of claim 16, further comprising:

operating, by the electronic controller, in a listen mode in which the electronic controller silences or turns off at least one of the first power tool device or the second power tool device.

20. The method of claim 16, wherein the adapter comprises the machine learning controller, and the method further comprises:

selectively switching, by an activation switch, between an activated state in which the electronic controller is in communication with the machine learning controller, and a deactivated state, in which the electronic controller is not in communication with the machine learning controller.

* * * * *